United States Patent
Whittaker et al.

(10) Patent No.: US 8,145,728 B2
(45) Date of Patent: Mar. 27, 2012

(54) METHOD, SYSTEM, AND COMPUTER PROGRAM PRODUCT FOR OFFLINE ADVERTISEMENT SERVICING AND CYCLING

(75) Inventors: Thomas Whittaker, Wanda, MN (US); Antony John Sargent, Menlo Park, CA (US)

(73) Assignee: IAnywhere Solutions, Inc., Dublin, CA (US)

( * ) Notice: Subject to any disclaimer, the term of this patent is extended or adjusted under 35 U.S.C. 154(b) by 0 days.

(21) Appl. No.: 12/042,178

(22) Filed: Mar. 4, 2008

(65) Prior Publication Data

US 2008/0154732 A1   Jun. 26, 2008

Related U.S. Application Data

(62) Division of application No. 10/923,019, filed on Aug. 23, 2004.

(51) Int. Cl.
*G06F 17/00* (2006.01)
(52) U.S. Cl. ........ 709/219; 709/217; 709/220; 709/231; 705/14
(58) Field of Classification Search .................. 709/219
See application file for complete search history.

(56) References Cited

U.S. PATENT DOCUMENTS

| | | |
|---|---|---|
| 5,349,678 A | 9/1994 | Morris et al. |
| 5,377,326 A | 12/1994 | Murata et al. |
| 5,392,390 A | 2/1995 | Crozier |
| 5,410,543 A | 4/1995 | Seitz et al. |
| 5,426,594 A | 6/1995 | Wright et al. |
| 5,666,530 A | 9/1997 | Clark et al. |
| 5,666,553 A | 9/1997 | Crozier |
| 5,673,322 A | 9/1997 | Pepe et al. |
| 5,684,828 A | 11/1997 | Bolan et al. |

(Continued)

FOREIGN PATENT DOCUMENTS

EP   0 714 066 A2   5/1996

(Continued)

OTHER PUBLICATIONS

"Method for bookmarking web pages of temporary interest," Research Disclosure, RD429108, Disclosed by Ericsson, Inc., Jan. 2000, Kenneth Mason Publications, Ltd., http://www.researchdisclosure.com, 1 page.

(Continued)

*Primary Examiner* — Jeffrey Pwu
*Assistant Examiner* — Sulaiman Nooristany
(74) *Attorney, Agent, or Firm* — Sterne, Kessler, Goldstein & Fox P.L.L.C.

(57) ABSTRACT

Methods, systems, apparatuses, and computer program products for servicing advertisements for offline display on mobile devices are provided. In a first aspect, a channel is received at a mobile device server from one or more providers, including a first web page, an advertiser web page, and an advertisement image file. The received channel is transmitted to the mobile device. In an offline mode, when displayed, the first web page includes an image contained by the advertisement image file. A user viewing the first web page on the mobile device can select the displayed image of the advertisement image file to traverse a link to cause the advertiser page to be displayed on the mobile device. In another aspect, a plurality of advertisement image files are received and stored at a mobile device. The display of the advertisement images on a first web page is cycled each time the first web page is displayed on the mobile device.

19 Claims, 14 Drawing Sheets

U.S. PATENT DOCUMENTS

| | | | |
|---|---|---|---|
| 5,684,990 A | 11/1997 | Boothby | |
| 5,694,546 A | 12/1997 | Reisman | |
| 5,727,129 A | 3/1998 | Barrett et al. | |
| 5,727,159 A | 3/1998 | Kikinis | |
| 5,727,202 A | 3/1998 | Kucala | |
| 5,732,074 A | 3/1998 | Spaur et al. | |
| 5,740,364 A | 4/1998 | Drerup | |
| 5,754,774 A | 5/1998 | Bittinger et al. | |
| 5,768,511 A | 6/1998 | Galvin et al. | |
| 5,790,977 A | 8/1998 | Ezekiel | |
| 5,794,259 A | 8/1998 | Kikinis | |
| 5,799,063 A | 8/1998 | Krane | |
| 5,802,292 A | 9/1998 | Mogul | |
| 5,805,807 A | 9/1998 | Hanson et al. | |
| 5,809,242 A | 9/1998 | Shaw et al. | |
| 5,813,007 A | 9/1998 | Nielsen | |
| 5,832,489 A | 11/1998 | Kucala | |
| 5,850,517 A | 12/1998 | Verkler et al. | |
| 5,862,339 A | 1/1999 | Bonnaure et al. | |
| 5,862,346 A | 1/1999 | Kley et al. | |
| 5,864,676 A | 1/1999 | Beer et al. | |
| 5,873,100 A | 2/1999 | Adams et al. | |
| 5,877,766 A | 3/1999 | Bates et al. | |
| 5,881,234 A | 3/1999 | Schwob | |
| 5,884,323 A | 3/1999 | Hawkins et al. | |
| 5,890,158 A | 3/1999 | House et al. | |
| 5,895,471 A | 4/1999 | King et al. | |
| 5,896,502 A | 4/1999 | Shieh et al. | |
| 5,906,657 A | 5/1999 | Tognazzini | |
| 5,917,491 A | 6/1999 | Bauersfeld | |
| 5,918,013 A | 6/1999 | Mighdoll et al. | |
| 5,918,237 A | 6/1999 | Montalbano | |
| 5,918,239 A * | 6/1999 | Allen et al. | 715/210 |
| 5,919,247 A | 7/1999 | Van Hoff et al. | |
| 5,922,045 A | 7/1999 | Hanson | |
| 5,928,329 A | 7/1999 | Clark et al. | |
| 5,937,163 A | 8/1999 | Lee et al. | |
| 5,943,676 A | 8/1999 | Boothby | |
| 5,946,697 A | 8/1999 | Shen | |
| 5,948,066 A | 9/1999 | Whalen et al. | |
| 5,953,392 A | 9/1999 | Rhie et al. | |
| 5,954,795 A | 9/1999 | Tomita et al. | |
| 5,961,601 A | 10/1999 | Iyengar | |
| 5,961,602 A | 10/1999 | Thompson et al. | |
| 5,974,238 A | 10/1999 | Chase, Jr. | |
| 5,978,828 A | 11/1999 | Greer et al. | |
| 5,978,833 A | 11/1999 | Pashley et al. | |
| 5,978,842 A | 11/1999 | Noble et al. | |
| 5,987,454 A | 11/1999 | Hobbs | |
| 5,987,476 A | 11/1999 | Imai et al. | |
| 5,987,499 A | 11/1999 | Morris et al. | |
| 5,991,800 A | 11/1999 | Burke et al. | |
| 6,000,000 A | 12/1999 | Hawkins et al. | |
| 6,006,231 A | 12/1999 | Popa | |
| 6,006,274 A | 12/1999 | Hawkins et al. | |
| 6,009,462 A | 12/1999 | Birrell et al. | |
| 6,012,083 A | 1/2000 | Savitzky et al. | |
| 6,014,698 A * | 1/2000 | Griffiths | 709/224 |
| 6,021,433 A | 2/2000 | Payne et al. | |
| 6,023,698 A | 2/2000 | Lavey, Jr. et al. | |
| 6,023,701 A | 2/2000 | Malik et al. | |
| 6,023,708 A | 2/2000 | Mendez et al. | |
| 6,026,474 A | 2/2000 | Carter et al. | |
| 6,029,175 A | 2/2000 | Chow et al. | |
| 6,029,195 A | 2/2000 | Herz | |
| 6,032,162 A | 2/2000 | Burke | |
| 6,035,324 A | 3/2000 | Chang et al. | |
| 6,041,360 A | 3/2000 | Himmel et al. | |
| 6,049,821 A | 4/2000 | Theriault et al. | |
| 6,052,735 A | 4/2000 | Ulrich et al. | |
| 6,058,416 A | 5/2000 | Mukherjee et al. | |
| 6,061,718 A | 5/2000 | Nelson | |
| 6,065,051 A | 5/2000 | Steele et al. | |
| 6,065,059 A | 5/2000 | Shieh et al. | |
| 6,070,184 A | 5/2000 | Blount et al. | |
| 6,076,109 A | 6/2000 | Kikinis | |
| 6,085,192 A | 7/2000 | Mendez et al. | |
| 6,119,167 A | 9/2000 | Boyle et al. | |
| 6,122,658 A | 9/2000 | Chaddha | |
| 6,131,096 A | 10/2000 | Ng et al. | |
| 6,148,330 A | 11/2000 | Puri et al. | |
| 6,161,146 A | 12/2000 | Kley et al. | |
| 6,167,255 A | 12/2000 | Kennedy, III et al. | |
| 6,195,692 B1 | 2/2001 | Hsu | |
| 6,209,027 B1 | 3/2001 | Gibson | |
| 6,209,111 B1 | 3/2001 | Kadyk et al. | |
| 6,219,696 B1 | 4/2001 | Wynblatt et al. | |
| 6,226,650 B1 | 5/2001 | Mahajan et al. | |
| 6,236,991 B1 | 5/2001 | Frauenhofer et al. | |
| 6,421,717 B1 * | 7/2002 | Kloba et al. | 709/219 |
| 2002/0016736 A1 * | 2/2002 | Cannon et al. | 705/14 |
| 2002/0052781 A1 | 5/2002 | Aufricht et al. | |
| 2002/0091762 A1 * | 7/2002 | Sohn et al. | 709/203 |
| 2002/0161826 A1 * | 10/2002 | Arteaga et al. | 709/203 |
| 2003/0112329 A1 | 6/2003 | Thomason | |
| 2003/0187771 A1 | 10/2003 | Bulan | |
| 2005/0257128 A1 | 11/2005 | Pasquali et al. | |
| 2005/0288951 A1 | 12/2005 | Stone et al. | |

FOREIGN PATENT DOCUMENTS

| | | |
|---|---|---|
| EP | 0 848 339 A1 | 6/1998 |
| EP | 0 876 034 A2 | 11/1998 |
| EP | 0 944 009 A2 | 9/1999 |
| EP | 1 061 458 A2 | 12/2000 |
| WO | WO 94/12938 A1 | 6/1994 |
| WO | WO 97/04389 A1 | 2/1997 |
| WO | WO 98/34203 A1 | 8/1998 |
| WO | WO 98/34422 A2 | 8/1998 |
| WO | WO 99/22322 A1 | 5/1999 |
| WO | WO 99/35802 A2 | 7/1999 |

OTHER PUBLICATIONS

"Appointments Off by One Hour After Synchronization," http://support.microsoft.com/support/kb/articles/q195/5/79.asp, last reviewed Sep. 2, 1999, provided by Microsoft Product Support Services, 1 page.

"Russian Nino Computer," http://webideas.com/russian/systems/nino301.htm, last visited Jul. 25, 2000, Wed Ideas Int'l Co., 1 page.

"512KB Organizer w/Synchronization," http://www.codemicro.com/fs/p11109.html, last visited Jul. 25, 2000, codemicro.com, 1 page.

"Synchronization Between Your Handheld PC and Desktop PC," http://www.microsoft.com/MOBILE/hpc/features/synch.asp, last visited Jul. 25, 2000, Microsoft, Inc., 1 page.

"Puma Adds Security to Wireless Syncing Software," http://devices.internet.com/news/q29908/990802puma/990802puma.html, last visited Jul. 25, 2000, Copyright 1999, internet.com Corp., 1 page.

"iMobile Data Synchronization Replicates Mobile Databases," http://www.synchrologic.com/about/about_imobile_data_synchronization.html, 2 pages, last visited Jul. 25, 2000, Synchrologic, Inc.

"WeSync.com Previews Wireless Synchronization Solution for Handheld Computers: Collaborative Service for Handheld Users Moves Into Public Beta Today; Wireless Refresh (TM) Lets Users Perform Narrow Bandwidth Wireless Syncs," http://www.palmsizepc.com/oct99-20-1.html, last visited Jul. 25, 2000, 3 pages, WeSync.com, Inc.

"XTNDConnect Server White Papers," http://www.extendsys.com/prodinfo/white/serversync/, last visited Jul. 25, 2000, 1 page, Extended Systems, Inc.

"Introduction to Wireless Internet & Mobile Computing Market," Copyright 1999, Wireless Internet & Mobile Computing, http://www.wirelessinternet.com/introto1.htm, last visited Jul. 24, 2000, 4 pgs.

"Databites," http://www.databites.com/company_info.htm, Databites Corporation, 2 pages, last visited Jul. 26, 2000.

"Tools for the TEKS: Integrating Technology in the Classroom: Offline Web Browsing—No More Excuses!," Copyright 1998, Wesley A. Fryer, last visited Jun. 22, 2000, http://www.wtvi.com/teks/article4.html, 9 pages.

Story, Derrick "Palm Browsing," Miller-Freeman, Inc., Jul. 30, 1999, http://www.webreview.com/pub/1999/07/30/feature/index.html, 2 pages.

Shultz, Greg "Take Advantage of Offline Browsing Tools: Learn to browse Web site content without being connected to the Internet," last visited Jun. 22, 2000, http://www.zdnet.com/zdhelp/stories/main/0,5594,2395480,00.html, Copyright 2000, ZD Inc., 2 pages.

Dalrymple, Jim "Palm-like Internet appliance on the way from 3Com,", Mar. 27, 2000, http://www.maccentral.com/news/0003/27.palm.shtml, Mac Publishing LLC, 3 pages.

"Offline Reading," http://www.microsoft.com/windows/Ie/Features/offline.asp, last updated Mar. 18, 1999, Microsoft Corporation, 1 page.

"InContext FlashSite," http://ipw.internet.com/clients_servers/offline_browsers/916161991.html, internet.com Corporation, Jan. 12, 1999, 2 pages.

"AvantGo Enterprise™," http://avantgo.com/enterprise/products/index.html, Copyright 2000 AvantGo, Inc., 2 pages, last visited Jun. 21, 2000.

"PalmPilot Software Programming and Development," http://www.pencomputersolutions.com/, Pen Computer Solutions, Inc., 4 pages, last edited Jun. 16, 2000.

"Pocket Browser 1.52 for Palm-size PC," http://www.ceshopper.com/ceshopper/pocketbrowser.html, Copyright 2000 CEShopper.com, last visited Jun. 22, 2000, 1 page.

"Answers & Tips: Browse the Web on Any Palm," http://web.zdnet.com/zdtv/screensavers/answerstips/story/0,3656,2408515,00.html, 2 pages, Copyright 1997-2000, ZDTV LLC, last visited Jun. 22, 2000.

"Palm Announces Mobile Internet Kit, Linking Palm Handhelds With Mobile Phones for Wireless Web Connectivity: New Web Clipping Applications to Provide Out-of-the-box Access to Leading Internet Content," http://biz.yahoo.com/bw/000627/ny_palm_2.html, Yahoo!, Jun. 27, 2000, 3 pages.

"GoAmerica Licenses Oracle Platform," http://www.allnetdevices.com/wireless/news/2000/06/27/goamerica_licenses.html, internet.com Corp., Jun. 27, 2000, 2 pages.

"ProxiWeb," http://aolcom.cnet.com/downloads/0-10126-100-1757359.html?tag=st.dl.10126_106_1.1st.td, Apr. 25, 2000, CNET Networks, Inc., 2 pages.

Wilcox, Joe, "IBM aims to put computers on the wrist," http://cnet.com/news/0-1006-200-2160685.html, CNET Networks, Inc., Jun. 27, 2000, 3 pages.

Portable Internet, http://www.portableinternet.com/, Copyright 2000, Portable Internet, Inc., last visited Jul. 5, 2000, 1 page.

BravuraNet, http://www.bravurnet.com, Copyright 2000, BravuraNet, last visited Jul. 13, 2000, 1 page.

"HotLinks: Store Bookmarks Online," http://www.zdnet.com/pcmag/stories/firstlooks/0,6763,2403245,00.html, Dec. 3, 1999, ZD Inc., 2 pages.

"MyBookmarks™," http://www.mybookmarks.com, Copyright 2000, MyBookmarks.com, LLC, last visited Jul. 13, 2000, 1 page.

Press Release, "AvantGo Presents Mobile Computing Software at Herring on the Enterprise: Organizations such as Grenley-Stewart Resources and Rosenbluth International Already Reaping Benefits," 1 page, Apr. 6, 1998, AvantGo, Inc.

Press Release, "AvantGo to Demonstrate New Enterprise Applications for the 3Com® PalmPilot™ Connected Organizer at Seybold '98: Applications Enable Networked Digital Workflows for Publishing Environments," 2 pages, Mar. 17, 1998, AvantGo, Inc.

Press Release, "AvantGo Software Extends Enterprise Applications to Handheld Devices: New Company Provides Instant Access to Essential Information for Mobile Professionals," 3 pages, Feb. 17, 1998, AvantGo, Inc.

Press Release, "Visto and AvantGo Team to Extend Web-Based Personal Content to Palm Pilot and Windows CE Devices: Visto Briefcase Will Leverage AvantGo 2.0 for Mobile Workforce," 2 pages, Sep. 21, 1998, AvantGo, Inc.

Press Release, "UpShot Partners with AvantGo to Display Latest Sales Data on Handhelds: Field Sales Representatives Will Have the Power of Sales Automation at Their Fingertips," 2 pages, Sep. 21, 1998, AvantGo, Inc.

Press Release, "AvantGo Announces Business Partner Program: VARs,Systems Integrators, Distributors and Consultants to Deliver Enterprise Applications for Handheld Computers," 2 pages, Sep. 21, 1998, AvantGo, Inc.

Press Release, "Industry Bigshots and Upstarts Rally Around AvantGo 2.0: Microsoft, IBM, Oracle, Symbol Technologies and Palm Computing Support AvantGo," 3 pages, Sep. 21, 1998, AvantGo, Inc.

Press Release, "Novatel Wireless and AvantGo Team Up to Provide Corporate Information to Wirelessly-Enabled Handhelds: Minstrel Modem and AvantGo 2.0 Extend Enterprise Connectivity," 2 pages, Sep. 21, 1998, AvantGo, Inc.

Press Release, "AvantGo Releases AvantGo 2.0—The Definitive Enterprise Solution for Managing Mobile Information: New Product Offering Provides Centralized Administration, Universal Remote Access and Mobile Transactions Between Corporate Databases and Handhelds," 3 pages, Sep. 21, 1998, AvantGo, Inc.

Press Release, "Casio Announces Support for AvantGo: AvantGo to Deliver Enterprise Applications for Casio's Windows CE-Compatible Devices," 2 pages, Sep. 21, 1998, AvantGo, Inc.

Press Release, AvantGo Integrated Into Pocket Internet Explorer for Pocket PCs: AvantGo Available on New Pocket PC Devices from Casio, Compaq, Hp and Symbol Technologies, 3 pages, Apr. 19, 2000, AvantGo, Inc.

Press Release, "AvantGo Completes $31 Million Mezzanine Financing: Goldman Sachs, American Express, Ford Motor Company, McKessonHBOC and Research In Motion (RIM) Accelerate Growth of Business-to-Business Mobile Internet Company," Apr. 17, 2000, AvantGo, Inc.

Press Release, "AvantGo Empowers BG's Leading Lights with Mobile Intranet and Internet Acces: Mobile Software gives International Energy Company an Advantage in Customer care and Business Management," 3 pages, Apr. 4, 2000, AvantGo, Inc.

Press Release, "AvantGo Embraces Macintosh Community: AvantGo Delivers Free Mobile Internet Service to Macintosh Users," 2 pages, Mar. 27, 2000, AvantGo, Inc.

Press Release, "AvantGo Joins GPRS Application Alliance: AvantGo Teams up with Ericsson to support Wireless Standards for Mobile Devices," 2 pages, Feb. 28, 2000, AvantGo, Inc.

Press Release, "AvantGo Integrated in Microsoft's Internet Explorer for the Pocket PC: Out of the Box, Mobile Users Gain Access to the Mobile Internet via Pocket Internet Explorer and AvantGo," 2 pages, Feb. 24, 2000, AvantGo, Inc.

Press Release, "AvantGo Joins Motorola Web w/o Wires Alliance Program: AvantGo Now Easily Accessible from Motorola Web Phones," 2 pages, Feb. 24, 2000, AvantGo, Inc.

Press Release, "AvantGo Optimizes User Experience On Palm IIIc™ Handheld Computers: With enhanced image support from AvantGo, Users Can View Web-Based Photos and Graphics in Color On New Devices," 2 pages, Feb. 24, 2000, AvantGo, Inc.

Press Release, "AvantGo.Com Bolsters Business Channels: New relationships with Business Week, Infonautics, The Economist, Fidelity Investments and The Financial News among the more than 80 Optimized AvantGo.com Business Channels for Mobile Device Users," 2 pages, Feb. 16, 2000, AvantGo, Inc.

Press Release, "Leading Labels and Music Sites Go Mobile With AvantGo.Com: Columbia Records, Universal's Interscope Geffen A&M, Ticketmaster Online-CitySearch's LiveDaily.com and Milor Entertainment Group join Amazon.com and mySimon.com to bring the Music Industry to Mobile Devices," 2 pages, Feb. 14, 2000, AvantGo Inc.

Press Release, "AvantGo Names Head of Dell Online, Richard Owen, CEO: Mobile Computing Leader Bolsters Management Team With Key New Hires," Jan. 25, 2000, AvantGo, Inc.

Press Release, "AvantGo Expands Relationship with InfoSpace.com: AvantGo to offer InfoSpace.com's Mobile Private Label Portals to Users of Palm Computing Platform, Windows CE and Wireless PDAs," 2 pages, Jan. 18, 2000, AvantGo, Inc.

Press Release, "AvantGo.Com Available to Macintosh Users," Jan. 5, 2000, AvantGo, Inc.

Press Release, "Verian Technologies and AvantGo Team Up to Resell Mobile Procurement Application: Bundled Software Package from Verian Provides Improved Inventory Management for Mobile Professionals," 2 pages, Jan. 3, 2000, AvantGo, Inc.

Press Release, "AvantGo Drives Healthcare Market Adoption of Handheld Devices: CHW, Mass General, McKessonHBOC, US Surgical, Norton Healthcare, Handheldmed.com, FitForAll.com and Asimba.com Select AvantGo to Deliver Critical Health Information to Mobile Devices," 3 pages, Dec. 14, 1999, AvantGo, Inc.

Press Release, "AvantGo Announces New AvantGo Enterprise Publisher: Mobile Leader Expands Enterprise Offerings to Extend Corporate Web Content to Mobile Devices," 2 pages, Dec. 6, 1999, AvantGo, Inc.

Press Release, "Go Network Delivers Mobile Solutions with AvantGo: Partnership to Give Wireless Users Access to GO Network Anytime, Anywhere," 2 pages, Nov. 11, 1999, AvantGo, Inc.

Press Release, "AvantGo Delivers Award-Winning Mobile Computing Software and Popular Consumer Internet Service to Europe: Company Expands into Europe; Phillip Hibberd to Head European Operations," 2 pages, Nov. 1, 1999, AvantGo, Inc.

Press Release, "AvantGo Mobile Unity Brings the Web to Wireless Devices: Mobile Computing Leader Brings the Web to Internet-enabled Phones and Wireless Handheld Devices; Integrates with Wireless Solutions," 4 pages, Oct. 25, 1999, AvantGo, Inc.

Press Release, Leading Mobile Computing Companies Form Industry Association: Puma, Aether Systems, Attachmate, AvantGo, Certicom, Globalware, Epocrates and the Windward Group Establish Mobile Application Link Forum to Advance and Promote Open Source Communications Protocol for Networked Applications, 3 pages, Oct. 18, 1999, AvantGo, Inc.

Press Release, "AvantGo Ships with New Special Edition Palm Vx™ Organizer," 2 pages, Oct. 13, 1999, AvantGo, Inc.

Press Release, "FT.Com and AvantGo Put the Latest International Business News in the Palm of Your Hand," 2 pages, Oct. 4, 1999, AvantGo, Inc.

Press Release, "Amazon.com First to Join AvantGo.com E-Commerce Initiative," 2 pages, Oct. 4, 1999, AvantGo, Inc.

Press Release, "AvantGo Teams With HP: AvantGo.com Now Available on the New HP Jornada 430se Palm-size PC," 2 pages, Sep. 27, 1999, AvantGo, Inc.

Press Release, "Sony Online Entertainment and AvantGo Announce Jeopardy! 2001 Online to be Delivered to Users of Handheld Devices: The Station @sony.com ventures beyond the Internet to extend distribution," 2 pages, Sep. 20, 1999, AvantGo, Inc.

Press Release, "AvantGo.com Scales to Showcase the Power of AvantGo Enterprise 3: Free Interactive Service Delivers More Than 15 Million Web Pages Daily to Hundreds of Thousands of Users," 2 pages, Sep. 7, 1999, AvantGo, Inc.

Press Release, "AvantGo Enterprise 3 Breaks Barrier Between Enterprise and Handhelds: Attachmate Corporation and AvantGo enter Into Business Alliance," 3 pages, Sep. 7, 1999, AvantGo, Inc.

Press Release, "AvantGo Signs CFO Thomas Hunter: Former IBM and First Data Corp. Executive Joins Leading Handheld Software Provider," 1 page, Aug. 23, 1999, AvantGo, Inc.

Press Release, Microsoft and AvantGo Deliver Personalized Content from Slate to AvantGo.com: Customized Information from Slate Now Available to Users of Palm OS- and Windows CE-Based Handheld Devices Through AvantGo.com, 2 pages, Aug. 9, 1999, AvantGo, Inc.

Press Release, "Salon.com to Provide Content for Palm Pilots and other Handheld Devices through AvantGo.com: News, Technology and other content from Salon.com now available to over 300,000 AvantGo.com subscribers," 2 pages, Jul. 26, 1999, AvantGo, Inc.

Press Release, "Wisdom Ware Partners with AvantGo to Provide Handheld Marketing and Sales Intelligence Solution: Reseller Agreement Enables Planned Wisdom Ware AnyWhere™ Service," 2 pages, Jul. 26, 1999, AvantGo, Inc.

Press Release, "Ontheroad.com Snapshots Double Every Two Weeks with AvantGo.com," 2 pages, Jul. 19, 1999, AvantGo, Inc.

Press Release, "AvantGo Partners with Vicinity to Provide Mapblast! Maps and directions to Handheld Device Users Through AvantGo.com," 2 pages, Jun. 28, 1999, AvantGo, Inc.

Press Release, "Microsoft and 3Com Invest in AvantGo: Mobile Computing Leader takes $14.7 Million in Third Round Funding from Microsoft, 3Com, Fayez Sarofim & Co., 21st Century Internet Venture Partners, H & Q Venture Associates and Adobe Ventures," 3 pages, Jun. 18, 1999, AvantGo, Inc.

Press Release, "AvantGo Teams with The Wall Street Journal Interactive Edition to Introduce New Personalized Content for AvantGo.com: AvantGo.com Provides News Services to PalmOS and Windows CE handheld users," 2 pages, May 17, 1999, AvantGo, Inc.

Press Release, "AvantGo.com Bolstered by Name Brand Handheld Makers, Wireless Providers and Content Publishers: Microsoft, Phillips, Casio, IBM, AT&T Wireless, GoAmerica, Novatel Wireless and Others Endorse Interactive Service with 100 Optimized Channels from Leading Content Providers," 6 pages, May 10, 1999, AvantGo, Inc.

Press Release, "AvantGo Unleashes AvantGo.com, the First Free Interactive Service for Mobile Device Users: New Personalized Service Puts the Power of the Web in the Palm of Your Hand," 3 pages, May 10, 1999, AvantGo, Inc.

Press Release, "David Harris Joins AvantGo as Vice President of Worldwide Sales and Business Development: Former Member of Adobe Senior Management Signs on with Industry-Leading Mobile Computing Company," 2 pages, Apr. 19, 1999, AvantGo, Inc.

Press Release, "AvantGo Logo Created by 1185 Design Recognized as Outstanding: Design Receives Prestigious Communications Arts (CA) Magazine Award; Logo to Appear in CA and American Corporate Identity Publications," 1 page, Mar. 29, 1999, AvantGo, Inc.

Press Release, "AvantGo Licenses Certicom's SSL Plus for Embedded Systems: Advanced Certicom security Technology now Available to Mobile Enterprise customers Using AvantGo with Windows CE and Palm Computing handhelds," 2 pages, Apr. 13, 1999, AvantGo, Inc.

Press Release, "AvantGo Integrates Seamlessly with New Minstrel III by Novatel Wireless: Interactive Wireless Data Capabilities Allow Real-time Access to Critical Information on Palm Computing Platform Devices," 2 pages, Apr. 6, 1999, AvantGo, Inc.

Press Release, "AvantGo and Microsoft Silicon Valley Developer Center to Offer Free Seminars to Enterprises Interested in Extending Applications to Windows CE-Based Devices: Attendees Can Register Today for Technical Sessions on Apr. 26-27 and May 24-25" 2 pages, Mar. 16, 1999, AvantGo, Inc.

Press Release, "AvantGo and the Windward Group Offer Free Seminars to Enterprises Interested in Extending Applications to Mobile Devices: Attendees Can Register Today for Bay Area Sessions on Apr. 28 & 29," 2 pages, Mar. 15, 1999, AvantGo, Inc.

Press Release, "AvantGo Recognized Again for Excellence in Mobile Computing: Mobile Insights Chooses AvantGo as Best Mobile Computing Solution in Wireless Internet and Intranet Category," 2 pages, Mar. 8, 1999, AvantGo, Inc.

Press Release, "AvantGo and Puma Deliver Open Source Code for Handheld-to-Server Connectivity: Microsoft, Sybase and Symbol Support Mobile Application Link as Key to Corporate Handheld Market Growth," 2 pages, Mar. 1, 1999, AvantGo, Inc.

Press Release, "AvantGo Takes Home Seven Leading Industry Awards: Hot Mobile Computing Software Company Recognized During 1998 for Creativity, Innovation and Candor," Feb. 8, 1999, AvantGo, Inc.

Press Release, "AvantGo Receives Two Awards from Tap Magazine," 1 page, Feb. 26, 1999, AvantGo, Inc.

Press Release, "Symbol Technologies and AvantGo Announce Relationships to Provide Barcode Scanning Web Client on Symbol's New Palm Terminals," 2 pages, Feb. 1, 1999, AvantGo, Inc.

Press Release, "AvantGo Announces Support for the Latest Version of Windows CE for the Palm-Size PC: Leader in Managing Mobile Information Allows its Growing Number of Users to Take Advantage of More Windows CE Functionality, Including Color," 2 pages, Feb. 1, 1999, AvantGo, Inc.

Press Release, "InfoSpace.com and AvantGo Deliver New Optimized Channels of Web Content to Handheld Devices: Companies introduce a comprehensive offering of Web content for handhelds," 2 pages, Jan. 28, 1999, AvantGo, Inc.

Press Release, "CNNfn and AvantGo Team Up to Help Users Keep Track of Breaking Business News on their Handheld Devices," 2 pages, Jan. 26, 1999, AvantGo, Inc.

Press Release, "CommerceNet Awards Ecommerce Innovation: AvantGo, Brokat, DealTime, eBay, and General Magic Receive Awards," Dec. 16, 1998, AvantGo, Inc.

Press Release, "AvantGo and Puma Technology Join Forces on Open Industry Initiative for Mobile Device/Corporate Enterprise Application Connectivity: Mobile Application Link Initiative Lauded as Key to Market Growth," 3 pages, Dec. 2, 1998, AvantGo, Inc.

Press Release, "The Sporting News to Deliver News, Scores to Handheld Devices: The Sporting News Teams with AvantGo to Offer In-Depth News, Analysis and Scores to Portable Platforms," 2 pages, Nov. 20, 1998, AvantGo, Inc.

Press Release, "Knight Ridder Real Cities and AvantGo Team up to Provide City Sites, News and Information on Handheld Computers: Visitors to Sites Have a Chance to Win Free Palm III Organizers in Introductory Contest," 2 pages, Nov. 18, 1998, AvantGo, Inc.

Press Release, "AvantGo and Oracle Team up to Deliver Mobile Applications to Handheld Devices: Combination of AvantGo and Oracle Lite Enables Unique Mobile Device Access to Oracle8i," 2 pages, Nov. 9, 1998, AvantGo, Inc.

Press Release, "Ziff-Davis and AvantGo Bring Award Winning Content From ZDNet.com to Handheld Devices," 2 pages, Oct. 26, 1998, AvantGo, Inc.

Press Release, "USA Today Online Partners with AvantGo to Deliver News, Sports & Money Briefs, Travel Tips and Dow Jones Charts to Users of Handheld Devices," 2 pages, Oct. 20, 1998, AvantGo, Inc.

Press Release, "IndustryWeek and AvantGo Team Up to Deliver Management Best Practices News and Information to Users of Handheld Devices," 2 pages, Oct. 6, 1998, AvantGo, Inc.

Press Release, "The Industry Standard and AvantGo Team Up to Deliver News to Portable Devices: New Business Publication Takes Advantage of Publishing Trend Toward New Delivery Formats," 2 pages, Aug. 24, 1998, AvantGo, Inc.

Press Release, "AT&T Executive Joins AvantGo Board of Directors: Robert J. Lesko Brings Global Services Expertise to Hot Start-Up," Aug. 10, 1998, AvantGo, Inc.

Press Release, "AvantGo Announces Agreement to Deliver News From The Wall Street Journal Interactive Edition to Handheld Computers," 2 pages, Aug. 3, 1998, AvantGo, Inc.

Press Release, "Get Your Five-Day Weather Forecast—On A Handheld: Weather24 and AvantGo Deliver "Weather to Go" Content for Mobile Computer Users," 2 pages, Jun. 22, 1998, AvantGo, Inc.

Press Release, "News America Digital Publishing Teams with AvantGo to Provide News, Sports, Business and Entertainment Information to Mobile Users," 2 pages, Jun. 22, 1998, AvantGo, Inc.

Press Release, "AvantGo Secures $3.5 Million in Venture Capital: Hambrecht & Quist, Adobe Ventures and 21st Century Internet Venture Partners Invest; Chris Hollenbeck Joins AvantGo Board of Directors," 2 pages, Jun. 8, 1998, AvantGo, Inc.

Press Release, "AvantGo Signs Stuart Read as Vice President of Marketing: Past Founder of Diba Joins Fast Growing Mobile Computing Company," May 26, 1998, AvantGo, Inc.

Press Release, "AvantGo Teams with Leading Publishers to Serve Up News for Mobile Users: Wired Digital, The New York Times, Mercury Center, InfoWorld and CNET Deliver Content for HandHelds," 3 pages, May 18, 1998, AvantGo, Inc.

Press Release, "AvantGo Wins DBMS Magazine Editor's Choice Award: Hot Mobile Computing Software Start-Up Recognized for Creativity and Innovation," Apr. 20, 1998, AvantGo, Inc.

Press Release, "AvantGo Licenses Java Technology to Palm Computing for the Conduit Development Kit, Java Edition: Technology Extends Enterprise Java Applications to the 3Com Palm Pilot Connected Organizer," 2 pages, Mar. 23, 1998, AvantGo, Inc.

"Shop for Everything: Store Your Online Bookmarks or Favorites on the Web," http://www.shop-for-everything.com/freestuff/bookmarks-favorites.html, last visited Jul. 13, 2000, 1 page.

Lei, H. et al., "DataX: An Approach to Ubiquitous Database Access," 2nd IEEE Workshop on Mobile Computing Systems and Applications (WMCSA), 1999 Proceedings, New Orleans, LA, Feb. 25-26, 1999, IEEE Comput. Soc., Los Alamitos, CA, pp. 70-79.

Kalakota, R., "Information Supply-Chains and Webcasting: A Design Framework," Fourth International Workshop on Community Networking, Proceedings, 1997, Atlanta, GA, Sep. 11-12, 1997, IEEE, NY, NY, pp. 103-111.

Joshi A. et al., "On Disconnected Browsing of Distributed Information," Seventh International Workshop on Research Issues in Data Engineering, 1997 Proceedings, Birmingham, UK, Apr. 7-8, 1997, IEEE Comput. Soc., Los Alamitos, CA, pp. 101-107.

Cerami, Ethan, *Delivering Push*, New York: McGraw-Hill, 1998.

* cited by examiner

METHOD, SYSTEM, AND COMPUTER PROGRAM PRODUCT FOR OFFLINE ADVERTISEMENT SERVICING AND CYCLING

CROSS REFERENCE TO RELATED APPLICATIONS

This application is a divisional of U.S. application Ser. No. 10/923,019, filed Aug. 23, 2004, which is incorporated by reference herein in its entirety.

BACKGROUND OF THE INVENTION

1. Field of the Invention

The present invention relates to mobile handheld devices, and in particular, to servicing and cycling of advertisements on mobile handheld devices.

2. Background Art

A web browser is an application a user typically uses to display and view web pages of websites that are accessible on the World Wide Web (i.e., "the Web"). When viewed, many web pages display advertisements in addition to other information relevant to the particular web page. Often, for each advertisement, the web page includes a generic image Uniform Resource Locator (URL) and a generic destination URL. The generic image URL provides a generic address for an image of the advertisement to display on the web page. For example, the generic image URL may provide an address to a server storing advertisement image files, such as an image file containing an automobile manufacturer advertisement banner image. The automobile manufacturer advertisement banner image may be displayed by a web browser when the web page containing the image URL is viewed. The generic destination URL of the advertisement provides an address of another web page that will be viewed by the web browser if a user viewing the advertisement image clicks on (i.e., selects) the advertisement image. For example, if the advertisement image is the automobile manufacturer advertisement banner, and a user "clicks" on this image on a web page, the destination URL will be used to cause the web browser to view the automobile manufacturer's home web page or other desired web page.

A variety of mobile devices (such as personal data assistants, or PDAs) exist. Web content (as well as other objects) can be loaded on mobile devices for users of mobile devices to view and interact with such web content on their mobile devices while in an offline mode (i.e., not connected to the Web).

However, difficulties exist in servicing web page advertisements on mobile devices when operating in an offline mode. Thus, what is needed are ways to service advertisements on mobile devices for offline viewing and access.

BRIEF SUMMARY OF THE INVENTION

In aspects of the present invention, methods, systems, apparatuses, and computer program products for servicing of advertisements on mobile devices are provided.

In a first aspect of the present invention, a method, apparatus, system, and computer program product in a mobile device server for servicing advertisements for offline viewing on a mobile device is described. A request for a channel is received from a mobile device. A request for the channel is transmitted to at least one provider. The channel is received from the at least one provider, including a first web page, an advertiser web page, and an advertisement image file. The first web page includes a generic advertisement image file link and an associated generic advertisement link that are related to a generic advertisement in the first web page. The advertiser web page and advertisement image file are associated. The advertiser web page and advertisement image file can be received from the at least one provider in either order. The received channel is transmitted to the mobile device, including transmitting the first web page, advertiser web page, and advertisement image file to the mobile device.

In an offline mode, the first web page is displayed on the mobile device. The received advertisement image file is displayed in the first web page. A user viewing the first web page on the mobile device can select the displayed advertisement image file to cause the advertiser page to be displayed on the mobile device.

In another aspect of the present invention, a method, apparatus, system, and computer program product in a mobile device for offline handling of advertisements is described. The mobile device is synchronized with a mobile device server, including: (1) requesting a channel from the mobile device server, and (2) receiving the channel from the mobile device server, including receiving a first web page, a second web page, and an advertisement image file. The first web page includes a generic advertisement, including a generic advertisement image file link and an associated generic advertisement link that are related to the generic advertisement. The second web page is a web page of an advertiser associated with the advertisement image file.

In an offline mode, the first web page is displayed on the mobile device. The received advertisement image file is displayed in the first web page. A user viewing the first web page on the mobile device is enabled to select the displayed advertisement image file to cause the second web page to be displayed on the mobile device.

In another aspect of the present invention, a method, apparatus, system, and computer program product for enabling access to advertisements on a mobile device, is described. A plurality of advertisement image files are received at the mobile device. Each advertisement image file corresponds to an advertisement image. The plurality of advertisement image files are stored on the mobile device. The display of the advertisement images on a first web page is cycled each time the first web page is displayed on the mobile device.

These and other objects, advantages and features will become readily apparent in view of the following detailed description of the invention.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
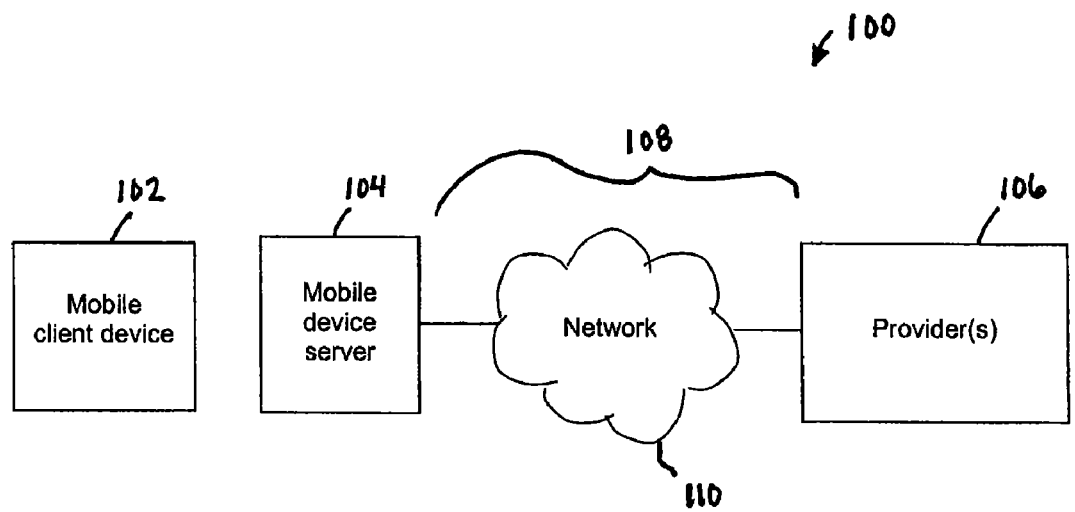
FIGS. 1 and 2 show block diagrams of example mobile computing environments, according to an embodiment of the present invention.

The present invention will now be described with reference to the accompanying drawings. In the drawings, generally, like reference numbers indicate identical or functionally/structurally similar elements. Additionally, generally, the left-most digit(s) of a reference number identifies the drawing in which the reference number first appears.

DETAILED DESCRIPTION OF THE INVENTION

Introduction

The present invention provides for enhanced capabilities in offline viewing of advertisements on mobile devices. Techniques for transferring advertisements to mobile devices, and displaying the transferred advertisements, are described. Furthermore, techniques for cycling the display of advertisements on mobile devices are described.

In an embodiment, the present invention allows for the cycling of advertisements on a mobile device. Multiple advertisement image files are cycled for display for a particular advertisement on a web page. Such image file cycling allows users to view greater numbers of advertisers for a given web page.

In another embodiment, the present invention enables the servicing of advertisements on mobile devices. Provider web pages, advertisement image files, and web pages of associated advertisers are downloaded to a mobile device. The provider web pages can be displayed on the mobile devices. The provider web pages include advertisement images corresponding to the advertisement image files. The advertisement images can be selected to cause the advertiser web pages to be viewed.

The advertisement image files and web pages of associated advertisers can be downloaded to the mobile device in any order. In other words, a web page of an advertiser can be downloaded to the mobile device before the advertisement image file associated with the advertiser is downloaded to the mobile device. Alternatively, the advertisement image file can be downloaded to the mobile device before the associated advertiser web page is downloaded.

Note that, as used to herein, a "link" or "hyperlink" refers to an object address that can be traversed. For example, such a link may be selectable in a web page, and may includes a uniform resource locator (URL) address, or other address format type, for a web page, image file, or other object.

In a web page, an advertisement is generally defined by an advertisement image file link and an advertisement destination link. The advertisement image file link is a link present in the web page that points to an advertisement image file of the advertisement. The advertisement destination link is a link present in a web page that points to a web page of an advertiser associated with the advertisement image file.

In an embodiment, a web page advertisement may be a generic web page advertisement. In other words, the generic web page advertisement does not relate to a specific advertisement, but instead includes a generic advertisement image file link and a generic advertisement destination link. Destination files for the generic links may be subsequently determined.

Further description of embodiments of the present invention is provided in the sections below. The following section describes example environments for the present invention. The subsequent sections describe embodiments for cycling advertisements on mobile devices, and embodiments for servicing advertisements on mobile devices.

Example Environment of the Present Invention

FIG. 1 is a block diagram of an example mobile computing environment 100 according to an embodiment of the invention. The mobile computing environment 100 includes a mobile client device 102, a mobile client server 104 (although only one mobile client server 104 is shown, in practice mobile computing environment 100 may include a plurality of such servers), and one or more providers 106.

Generally, mobile client server 104 maintains a collection of channels. In an embodiment, a channel comprises a collection of objects. An object is any entity or data that can be transferred to a mobile client device 102, such as but not limited to a web pages, content, applications, application data, services, images, movies, music, links, etc. A channel can include a location of a root object, such as but not limited to a URL (uniform resource locator), and an indication of the number of levels below the root object, for which to include objects in the channel. For example, in an embodiment, if a channel number property is equal to "1 level," then all objects that are 1 level down from the root object (reached by traversing links in the root object), are included in the channel. If this property is equal to "2 levels," then all objects that are 1 level down from the root object (reached by traversing links in the root object), and all objects that are 1 level down from those objects (reached by traversing links in those objects), are included in the channel.

For example, the root object for a first channel may be a first web page, and the channel property may be equal to "1 level." Mobile client server 104 obtains and parses the first web page for objects that are 1 level down from the first web page. For instance, mobile client server 104 may locate a first link to an image file, and an associated second link used when the image of the image file is selected in a web page (i.e., a "destination" link). For example, the second link may be a link to a second web page. Mobile client server 104 traverses the first and second links to gather copies of the image file and second web page, respectively, for inclusion in the channel. The channel can subsequently be transferred to mobile client device 102, including transfer of the first and second web pages, and the image file.

Embodiments of the invention allow "uneven" trees, where some branches of the tree extend to a greater number of levels than other branches of the tree. In other embodiments, the trees are even or balanced.

Mobile client server 104 offers channels to mobile client device 102. Mobile client device 102 may access mobile client server 104 and view the collection of channels. The mobile client device 102 may then select any combination of the channels in the collection. Mobile client server 104 maintains a list of the channels associated with mobile client device 102.

As shown in FIG. 1, mobile client device 102 is not coupled to mobile client server 104. Thus, in FIG. 1, mobile client device 102 is operating in an "offline" mode. Mobile client device 102 and mobile client server 104 may be coupled together to perform a synchronization process. The synchronization process of the invention includes various synchronization processes/operations that can collect information from the Internet to a server, and to the client. The usage of the term "sync" or "synchronization process" as described herein, refers to the overall operation of connecting a client to a server for the exchange, interaction, creation, and removal of data.

In one embodiment, syncing can be defined as mirroring data on a client and a server, such that the data is the same on client and server. In other embodiments, syncing can be defined as overwriting data on a client or on a server, such that the data on either a client replaces the data on a server, and vice versa.

Figure 2:
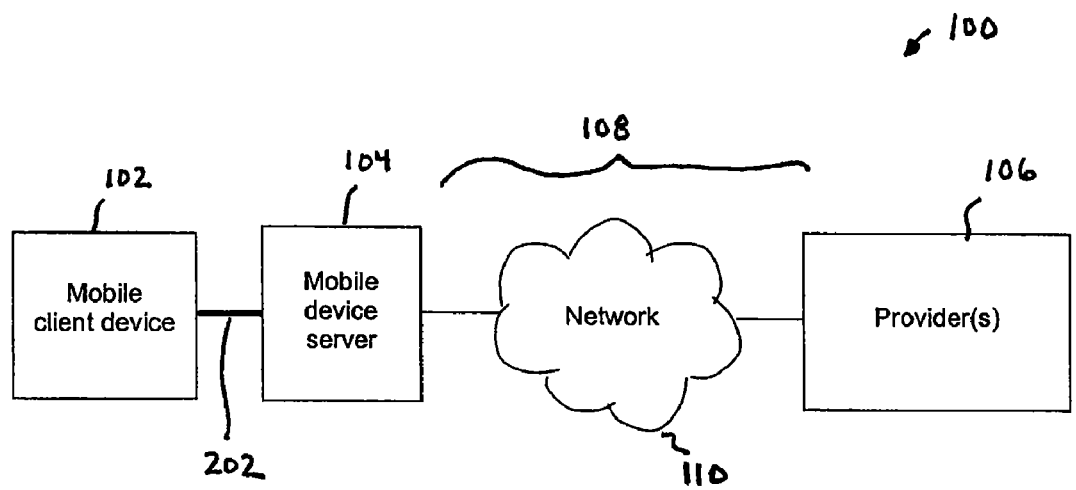

For example, FIG. 2 shows mobile client device 102 and mobile client server 104 coupled together by a communications link 202. Mobile client device 102 and mobile client server 104 may be coupled together by link 202 in either a wired or wireless manner. During a synchronization process, mobile client server 104 loads a device 102 with the channels associated with the mobile client device 102. Generally, mobile client server 104 does this by obtaining from providers 102 the objects defined by the channels, and causing those objects to be stored on the mobile client device 102. Thus, during the synchronization process, mobile client server 104 will load the mobile client device 102 with the selected channels. More particularly, mobile client server 104 will load the mobile client device 102 with the objects associated with the channels. Thus, in embodiments where mobile client server 104 performs a synchronization process, mobile client server 104 can also be referred to as a synchronization server, or "sync" server.

The mobile client device 102 may process and use those objects when not connected to the mobile client server 104 (i.e., in the "offline" mode, such as shown in FIG. 1). The mobile client device 102 can actively interact with the objects and channels in the offline mode.

Data transferred to mobile client device 102 from mobile client server 104 may be transferred without reformatting/encoding (e.g., web pages may remain in HTML format), or alternatively the data may have been reformatted and/or encoded. For example, in an embodiment, data transferred to mobile client device 102 may be encoded by mobile client server 104 in a data format called "Already Been Chewed" or "Already Been Compressed" (ABC), which is a tokenized version of the data. For example, ABC format creates a tokenized codification of HTML pages for transfer to mobile client device 102. ABC encoding is a mapping of parent and child HTML elements and/or resources to alphanumeric values.

For example, a first online web page may include a link to an online resource, such as another web page, http://www.yahoo.com. The first online web page may be copied to mobile client server 104, and ABC encoded by mobile client server 104 for offline use on mobile client device 102. Likewise, the referenced web page of www.yahoo.com is copied to mobile client server 104, and may be encoded. Furthermore, mobile client server 104 prepares the copied web page of www.yahoo.com to be stored in a directory of mobile client device 102. For example, the directory may be /programs/webfiles, and the copied web page of www.yahoo.com may be renamed as "AAAyahoo1." Accordingly, any links to www.yahoo.com in the encoded first web page must be changed to the offline accessible resource name. Thus, during encoding, any links to www.yahoo.com in the first web page are changed by mobile client server 104 to "/programs/webfiles/AAAyahoo1." The first web page and AAAyahoo1 may subsequently be transferred to mobile client device 102 for offline access.

During synchronization with mobile client server 104, mobile client device 102 is coupled with mobile client server 104. In embodiments, mobile client device 102 directly communicates with mobile client server 104 via a communications medium 110 in a wired and/or wireless fashion using any protocol. For example, device 102 may "dock" directly with mobile client server 104 in a wired fashion. In another embodiment, mobile client device 102 indirectly interacts with mobile client server 104 via an adapter (not shown in FIG. 1). For example, mobile client device 102 may be a device, such as a Palm device, and the adapter may be a cradle and a computer coupled to the cradle (e.g., mobile client device 102 is inserted into the cradle). In such an embodiment, the adapter presents itself to mobile client server 104 as a mobile client device. When mobile client server 104 sends objects to the adapter, the adapter writes those objects to mobile client device 102. In embodiments, device 102 and/or an adapter (when present) can include a Hot Sync™ Manager (in a Palm operating environment, for example), an Active Sync™ (in the Windows CE™ operating environment, for example), or Pilot Link™ (in the Unix operating environment, for example) etc. It is noted that the invention is not limited to any of the implementation examples discussed herein, and that these implementation examples are provided for illustrative purposes only.

Device 102 may be any type of data processing device. In embodiments of the invention, device 102 is a mobile computing device, although the invention is not limited to these embodiments. In such example embodiments, the device 102 may be, but is not limited to, handheld computers, cellular phones, internet-enabled phones, pagers, radios, televisions, audio devices, MP3 players, car audio systems, recorders, text-to-speech devices, bar-code scanners, net appliances, mini-browsers, personal data assistants (PDAs), etc.

In embodiments of the invention, device 102 includes software, hardware, firmware, and/or any combinations thereof to provide its functions. In an embodiment, mobile client device 102 includes a user interface (UI), a web browser, and a JavaScript engine. Other embodiments of mobile client device 102 may include alternative and/or additional modules.

The invention is also directed to computer program products comprising software stored on any computer useable medium. Such software, when executed in one or more data processing devices, causes the data processing device(s) to operate as described herein. Embodiments of the invention employ any computer useable or readable medium, known now or in the future. Examples of computer useable mediums include, but are not limited to, primary storage devices (for example, any type of random access memories), secondary storage devices (for example, hard drives, floppy disks, compact discs (CDs), ZIP disks, tapes, magnetic storage devices, optical storage devices, micro-electromechanical systems (MEMS), nanotechnological storage devices, etc.), and communication mediums (wired and wireless connections and networks, local area networks, wide area networks, intranets, etc.).

The user interface of device 102 preferably includes a graphical user interface that enables users to interact with mobile client device 102 and functions and modules provided by mobile client device 102. For example, the user interface can display web pages that have been downloaded to device 102, and can allow users to interact with the web pages. The JavaScript engine of device 102 executes objects written in the JavaScript language that operate on mobile client device 102. Web pages displayable by mobile client device 102 typically comprise a series of commands of HTML (Hyper-Text Markup Language), XML (Extensible Markup Language), and/or other language understood by mobile web browsers.

Providers 106 are sources of various types of objects, such as but not limited to content (content providers), applications (application providers), services (service providers), etc. Providers 106 may also include servers (similar to mobile client server 104), which may provide objects such as but not limited to content, applications, services, etc.

Mobile client server 104 and providers 106 are coupled together through a communication path 108. Communication path 108 can be any type of communication link, or combination of links, wired or wireless. For example, communication path 108 can include one or more networks, including a network 110. Mobile client server 104 and application provider 106 can be located within the same computer system, or in different computer systems.

For example, mobile client server 104 can reside in a first computer system, and providers 106 can reside in a second or further computer systems. The computer systems can be workstations, personal computers, or any other computer system type. In such an arrangement, mobile client server 104 and providers 106 typically communicate through a network connection (wired, wireless, or combination). Communication path 108 can include any number of links and/or networks, including network 110. Network 110 can be any type of network, or combinations of networks, including a local area network (LAN) and/or wide area network (WAN), including an intranet and/or the Internet. Alternatively, one or more providers of providers 106 can be present in a single computer system with mobile client server 104.

Example Embodiments for Cycling of Advertisements on Mobile Devices

Embodiments of the present invention are provided in this section for enabling the cycling of advertisements on mobile devices. These embodiments are provided for illustrative purposes, and are not limiting. Additional operational and structural embodiments for the present invention will be apparent to persons skilled in the relevant art(s) from the description herein. These additional embodiments are within the scope and spirit of the present invention.

According to embodiments of the present invention, a library of advertisements is copied to, and stored on a mobile device. A web page present on the mobile device includes a location for display of an advertisement. When the web page is displayed on the mobile device, a first advertisement is selected from the stored library and is displayed in the web page at the location of the advertisement. The next time the web page is displayed, a second advertisement is selected from the stored library and is displayed on the web page at the location of the advertisement. Subsequent displaying of the web page causes further advertisements of the stored library to be selected and displayed at the location for the advertisement. Furthermore, the selected first and/or second advertisements may be redisplayed during subsequent displaying of the web page.

In this manner, greater numbers of advertisements may be viewed in a web page by a user of a mobile device, providing exposure for the user to greater numbers of products and services. Furthermore, additional revenue from advertisers can be generated by an entity that collects and provides the greater number of advertisements to the mobile device.

Figure 13:
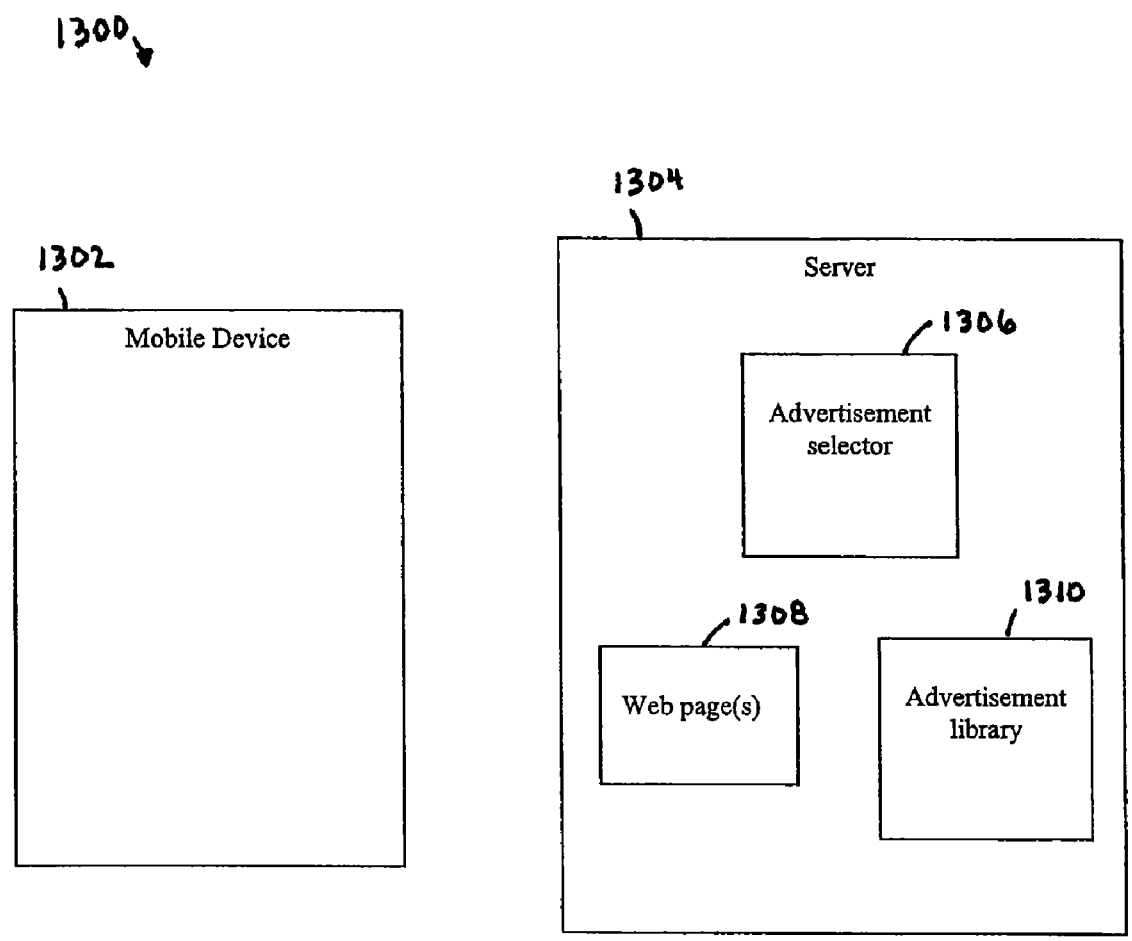
FIGS. 13 and 14 show views of a system for enabling the cycling of advertisements on a mobile device, according to an example embodiment of the present invention.
Figure 14:
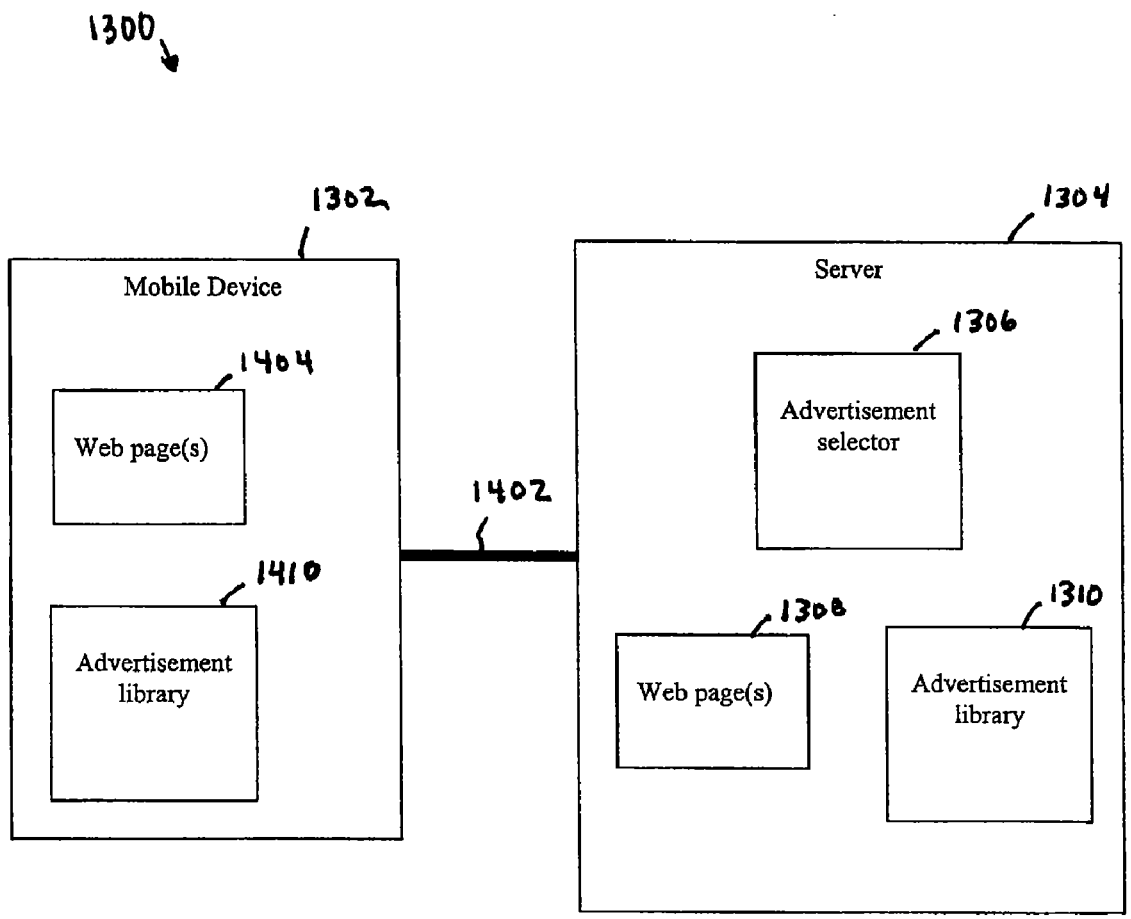

FIGS. 13 and 14 relate to a system 1300 for enabling the cycling of advertisements on a mobile device, according to an example embodiment of the present invention. System 1300 includes a mobile device 1302 and a mobile device server 1304. Mobile device 1302 is similar to mobile client device 102, and mobile device server 1304 is similar to mobile client server 104 shown in FIGS. 1 and 2, and further described above.

Mobile device server 1304 includes an advertisement selector 1306, one or more web page(s) 1308, and an advertisement library 1310. Web page(s) 1308 are one or more web pages stored for copy to mobile device 1302. One or more web pages of web page(s) 1308 include references to one or more advertisements.

Advertisement library 1310 includes a plurality of advertisement image files that can be displayed in a web page, and associated advertiser web pages. For example, an advertisement image file is similar to advertisement image file 616 shown in FIG. 6 and described above, and an advertiser web page is similar to advertiser web page 614 described above. In an embodiment, mobile device server 1304 requests, and receives copies of the advertisement image files and advertiser web pages for advertisement library 1310 from one or more providers, such as provider(s) 106 shown in FIG. 1. For example, at least some of the advertisement image files may be copied from an advertisement server and/or advertiser server, such as advertisement server 606 and advertising entity server 608 shown in FIG. 6. In another embodiment, at least some of the advertisement image files may be copied to mobile device server 1304 directly from a computer compatible software storage medium, such as a compact disc or digital video disc (DVD) formatted disc.

Advertisement selector 1306 is optional. When present, advertisement selector 1306 selects advertisements of advertisement library 1310 for transfer to a mobile device. For example, a list of advertisements stored on mobile device server 1304 may be maintained on mobile device server 1304. Advertisement selector 1306 may select a subset of the advertisements for transfer to the mobile device. Advertisement selector 1306 may select the subset of advertisements based on user preferences, to provide advertisements to the mobile device that would be of interest to a user of the mobile device. Advertisement selector 1306 may generate and maintain a list of the advertisements in the subset of advertisements to be transferred.

When present, advertisement selector 1306 can be implemented in hardware, software, firmware, and any combination thereof. For example, in an embodiment, advertisement selector 1306 may be a software module loaded onto mobile device server 1304 over a network communications link, or from any type of computer compatible software storage medium.

Alternatively, advertisement selector 1306 is not present. For example, in such an embodiment, all advertisements of advertisement library 1310 are transferred to a mobile device, or selected advertisement image files and advertiser web pages of advertisement library 1310 are transferred to the mobile device according to predetermined criteria.

FIG. 14 shows mobile device 1302 and mobile device server 1304 coupled together by communications link 1402, which is similar to link 202 shown in FIG. 2. For example, mobile device 1302 and mobile device server 1304 may become coupled together to perform a synchronization process, or other process to exchange data/objects. As shown in FIG. 14, web page(s) 1404, and an advertisement library 1410 are transmitted to mobile device 1302 from mobile device server 1304 over link 1402. Web page(s) 1404 includes at least a portion of the web page(s) of web page(s) 1308. Advertisement library 1410 contains at least a portion of the advertisement image files and corresponding advertiser web pages of advertisement library 1310.

Figure 15:
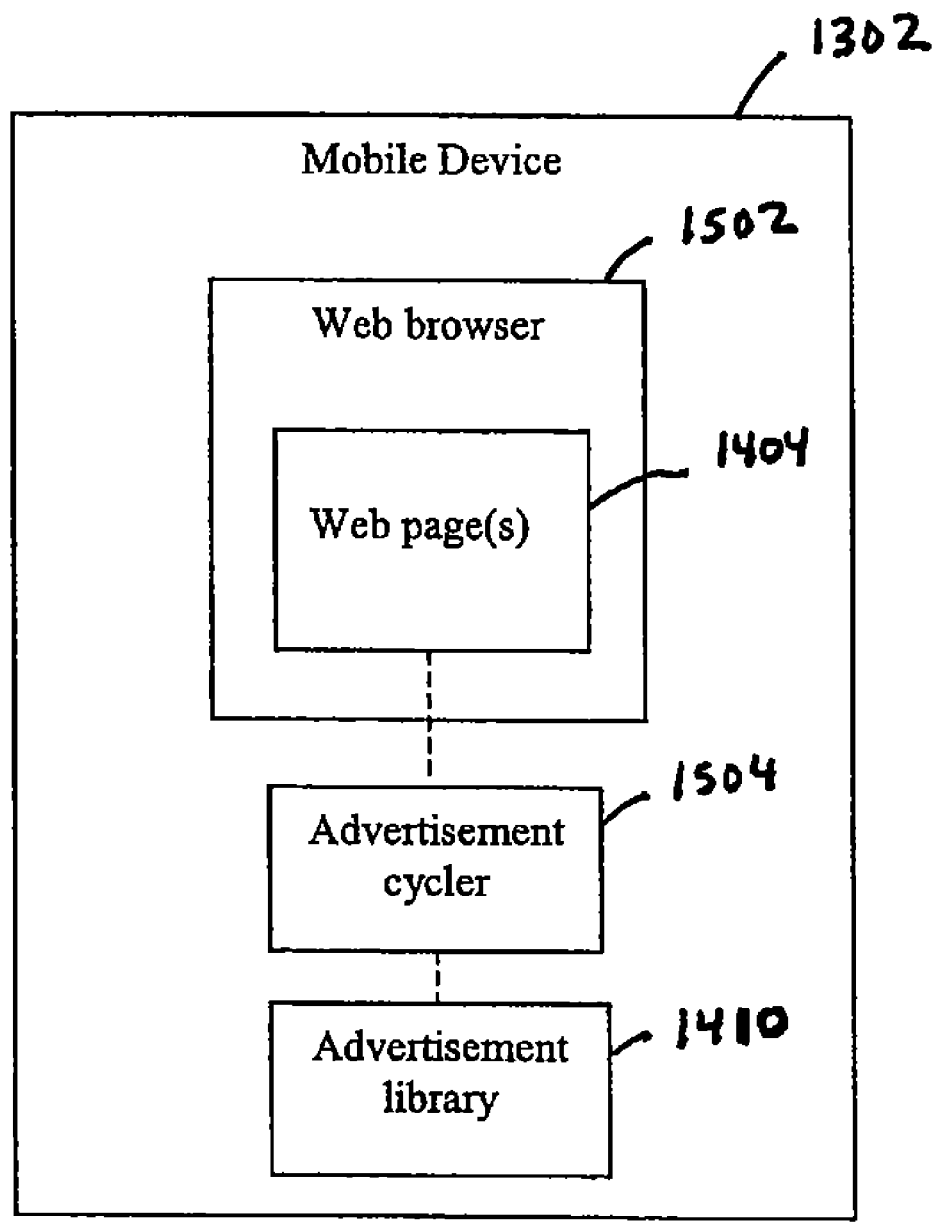
FIG. 15 shows a mobile device, incorporating advertisement cycling, according to an example embodiment of the present invention.

FIG. 15 shows mobile device 1302, according to an example embodiment of the present invention. As shown in FIG. 15, mobile device 1302 includes web page(s) 1404, advertisement library 1410, a web browser 1502, and an advertisement cycler 1504. Web browser 1502 is used by a user of mobile device 1302 to display web page(s) 1404. Web page(s) 1404 include references to advertisement cycler 1504. For example, in an embodiment, prior to download to mobile device 1302, mobile device server 1304 encodes/reformats web page(s) 1404 so that instead of including links/references to specific advertisements, web page(s) 1404 reference advertisement cycler 1504.

Figure 16A:
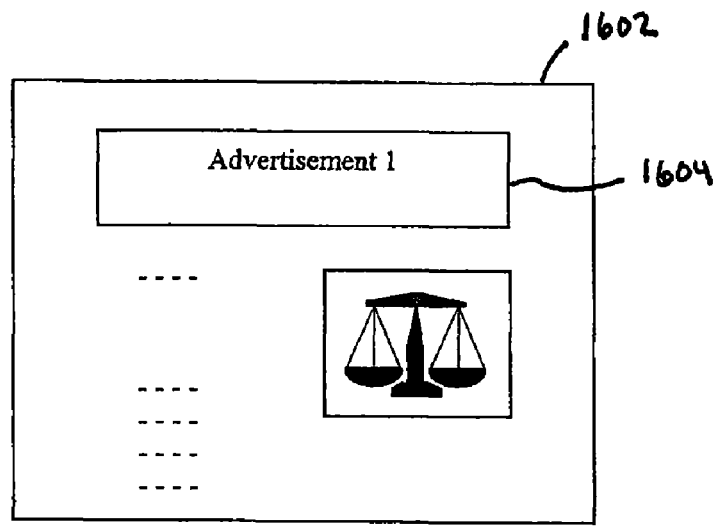
FIGS. 16A and 16B show example web pages displaying cycled advertisements, according to example embodiments of the present invention.

Advertisement cycler 1504 is used to cycle advertisement image files of advertisement library 1410 for display in web pages(s) 1404. For example, FIG. 16A shows display of a web page 1602 of web page(s) 1404. When web page 1602 is displayed, the link/reference to advertisement cycler 1504 is traversed to provide an advertisement for display. For example, a link/reference in web page 1602 can include information, including a tag, that indicates advertisement cycler 1504 should be used to select an advertisement. Advertisement cycler 1504 selects an advertisement image file of advertisement library 1410 for display as a first advertisement image 1604 in web page 1602 when displayed by web browser 1502. If a user selects (or otherwise interacts with) first advertisement image 1604, a link/reference to advertisement cycler 1504 will be traversed, to cause a corresponding advertiser web page to be displayed.

Figure 16B:
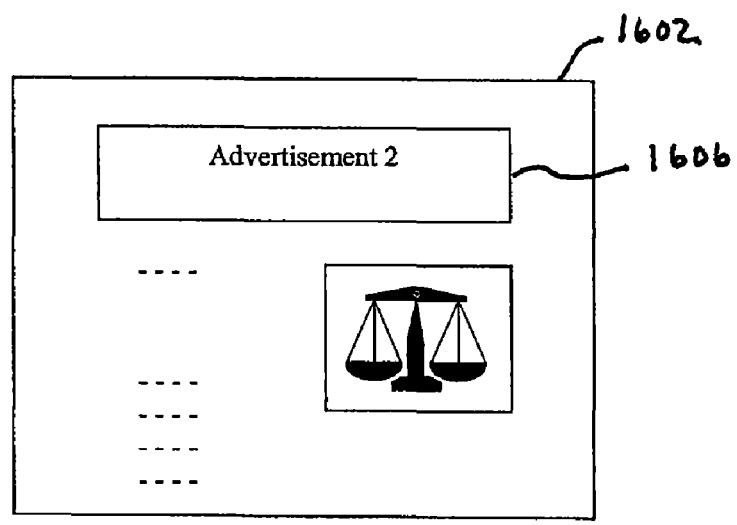

FIG. 16B shows web page 1602 being displayed a subsequent time after that of FIG. 16A. Advertisement cycler 1504 selects a second advertisement image file of advertisement library 1410 for display as a second advertisement image 1606 in web page 1602 when displayed by web browser 1502. If a user selects (or otherwise interacts with) second advertisement image 1606, a link/reference to advertisement cycler 1504 will be traversed, to cause a corresponding advertiser web page to be displayed. Furthermore, each time web page 1602 is subsequently displayed, advertisement cycler 1504 selects subsequent advertisement image files for display in web page 1602.

Note that the present invention is applicable to any fashion of redisplay of a web page. For example, a web page may be redisplayed by: (a) refreshing the web page (e.g., using a "refresh" feature of a browser), (b) reselecting a link to the web page, (c) using a "back" or "forward" feature of a browser, and any other way known to persons skilled in the relevant art(s).

Advertisement cycler 1504 can select advertisement image files for display according to any selection algorithm. Advertisement cycler 1504 may maintain a list of advertisements of advertisement library 1410. In an embodiment, advertisement cycler 1504 may select advertisements from the list for display. Advertisement cycler 1504 may select advertisements for display from the list in the order the advertisements are listed, or in any other order or sequence. Alternatively, advertisements may be selected randomly, or according to any other selection algorithm as desired, to display a variety of advertisements in a particular web page. In an embodiment, advertisements that have not been previously displayed are selected for display. Furthermore, in an embodiment, advertisement cycler 1504 may take into account user preferences when cycling advertisements.

Advertisement cycler 1504 can be implemented in hardware, software, firmware, and any combination thereof. For example, in an embodiment, advertisement cycler 1504 may be a software module loaded onto mobile device 1302 over a network communications link, or directly from any type of computer compatible software storage medium.

Figure 17:
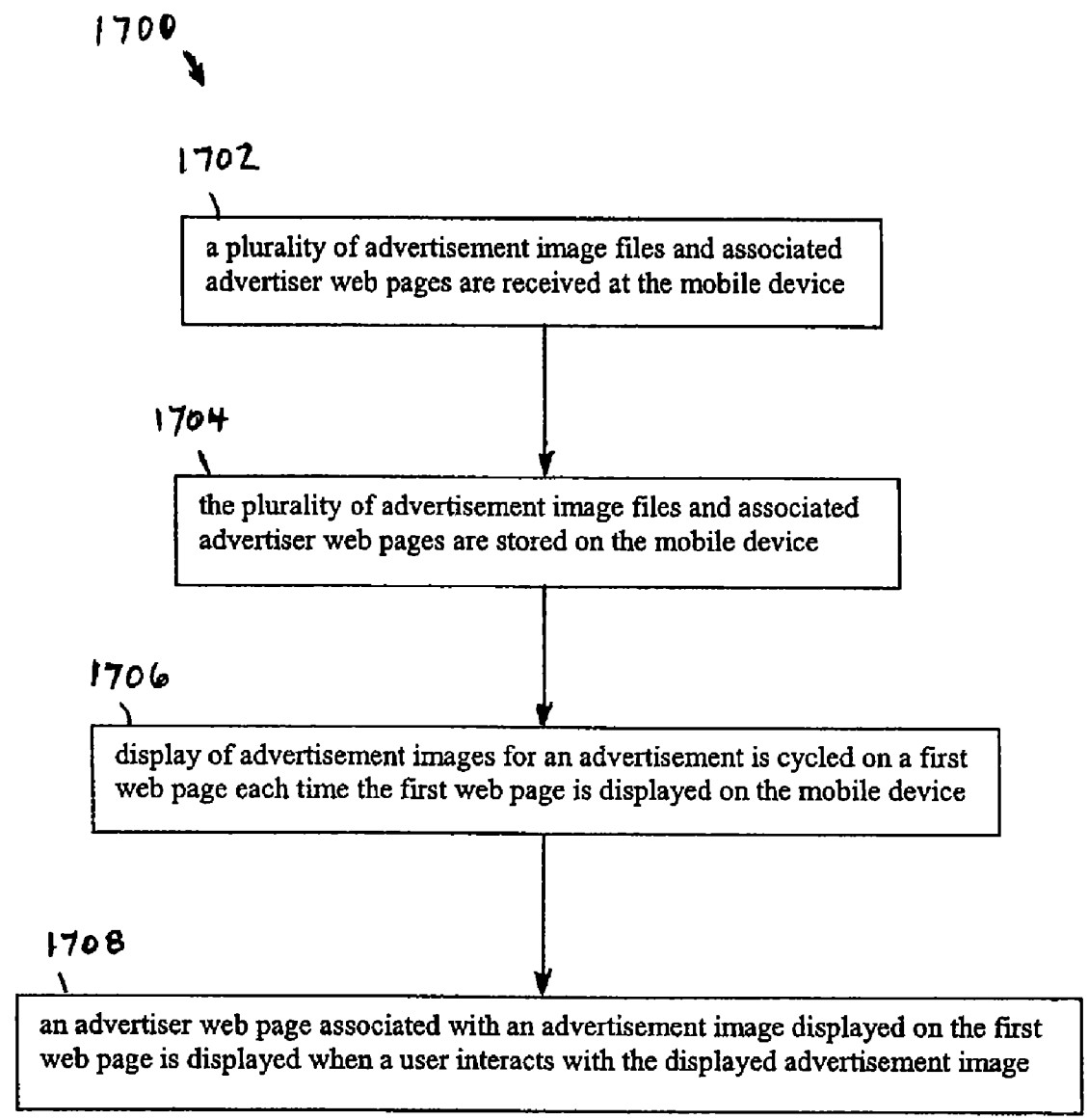
FIG. 17 shows a flowchart providing example steps for enabling the cycling of advertisements on a mobile device, according to an example embodiment of the present invention.

FIG. 17 shows a flowchart 1700 providing example steps for enabling the cycling of advertisements on a mobile device, according to an example embodiment of the present invention. For example, in an embodiment, the mobile device may be mobile device 1302 shown in FIG. 13. Other structural and operational embodiments will be apparent to persons skilled in the relevant art(s) based on the following discussion. These steps are described in detail below.

Flowchart 1700 begins with step 1702. In step 1702, a plurality of advertisement image files and associated advertiser web pages are received at the mobile device. For example, the plurality of advertisement image files and advertiser web pages are received from mobile device server 1304. In an embodiment, step 1702 occurs during a synchronization process, or during any other process for transferring data/objects between mobile device 1302 and mobile device server 1304.

In step 1704, the plurality of advertisement image files and associated advertiser web pages are stored on the mobile device. For example, the plurality of advertisement image files and associated advertiser web pages are stored as advertisement library 1410 on mobile device 1302.

In step 1706, display of advertisement images for an advertisement is cycled on a first web page each time the first web page is displayed on the mobile device. The advertisement images correspond to the advertisement image files of advertisement library 1410. As described above, advertisement image files of advertisement library 1410 are cycled for display on a web page, such as web page 1602 shown in FIG. 16.

In step 1708, an advertiser web page associated with an advertisement image displayed on the first web page is displayed when a user interacts with the displayed advertisement image. In other words, when an advertisement image, such as one of first or second advertisement images 1604 and 1606, is selected on a web page, such as web page 1602, a second web page, which is typically a web page of an advertising entity corresponding to the advertisement image, is displayed. The advertising entity web pages may be transferred to the mobile device at any time, including during step 1702, and/or during a synchronization process with the mobile device server.

Example Embodiments for Servicing Advertisements on Mobile Devices

Embodiments of the present invention are provided in this section for enabling the servicing of advertisements on mobile devices. These embodiments are provided for illustrative purposes, and are not limiting. Additional operational and structural embodiments for the present invention will be apparent to persons skilled in the relevant art(s) from the description herein. These additional embodiments are within the scope and spirit of the present invention.

Conventional Online Advertisement Servicing

Figure 3:
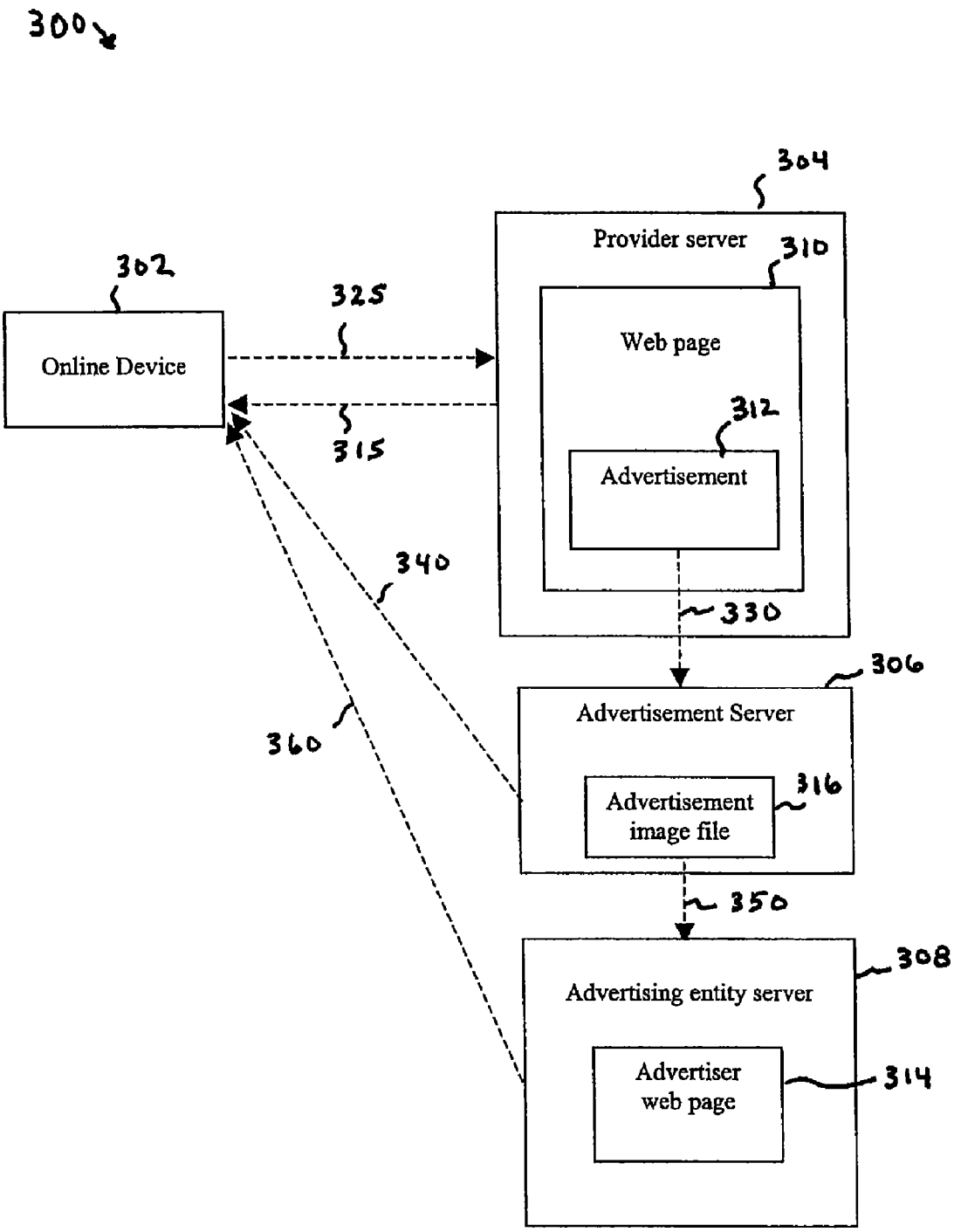
FIG. 3 shows a conventional system for servicing advertisements to an online device.

A conventional advertisement servicing scheme for "online" devices is first described with reference to FIG. 3. FIG. 3 shows a conventional system 300 for servicing advertisements for online devices, such as Internet-connected desktop computers. Online system 300 includes an online device 302, which interacts with various providers, including a provider server 304, an advertisement server 306, and an advertising entity server 308. In system 300, provider server 304 is used to serve content for a provider entity. For example, provider server 304 serves web page 310. Advertisement server 306 serves advertisements to other providers. For example, advertisement server 306 serves an advertisement 312 that is present in web page 310. Advertising entity server 308 is a server for an advertising entity (i.e., an advertiser) that sells products and/or services (such as an automobile manufacturer). Advertising entity server 308 serves web pages of the advertising entity.

Figure 4:
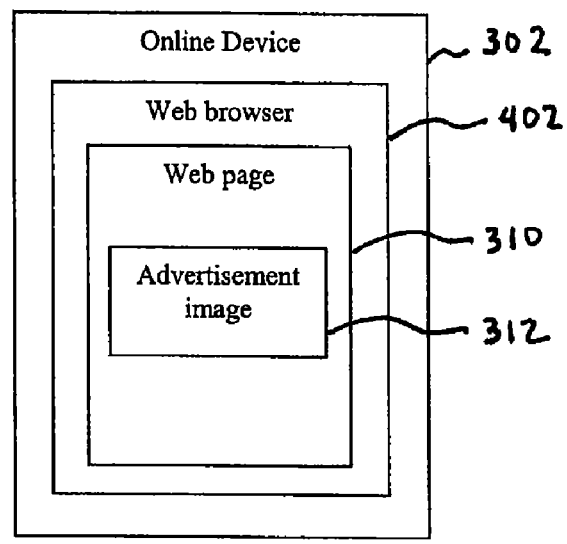
FIGS. 4 and 5 show views of an online device viewing web pages having advertisements, using a web browser.

As shown in FIG. 4, online device 302 uses a web browser 402 to view web page 310 served by provider server 304. Thus, online device 302 requests web page 310 from provider server 304 (as indicated in FIG. 3 by arrow 325). As shown in FIG. 3, web page 310 is transmitted by provider server 304, and received by online device 302, in response to the request (as indicated in FIG. 3 by arrow 315). Web page 310 includes advertisement 312. Advertisement 312 is displayed on web page 310 as an image, such as an advertisement banner, that may be selected (i.e., clicked on) to view a web page of an advertising entity. In the HTML code (or other code) of web page 310, advertisement 312 is defined by a generic advertisement image file link and a generic advertisement destination link. The generic advertisement image file link provides a generic address for the advertisement image file that is displayed on web page 310. The generic advertisement destination link provides a generic address for an advertising entity's web page that is traversed when the advertisement image is selected.

The generic advertisement image file link and generic advertisement destination link both point to advertisement server 306 (as indicated in FIG. 3 by arrow 330). Thus, advertisement server 306 serves advertisement 312 for web page 310. Advertisement server 306 selects and supplies an advertising image file corresponding to the generic advertisement image file link of advertisement 312 when the image of advertisement 312 is to be displayed in web page 310 on online device 302. Thus, advertisement server 306 transmits the advertisement image file, shown in FIG. 3 as advertising image file 316, which is received by online device 302 (as indicated in FIG. 3 by arrow 340).

Furthermore, advertisement server 306 stores a destination web page link to an advertising entity web page that is to be traversed when the advertising image is selected (i.e., when the generic advertisement destination link is traversed). For example, the stored destination web page link may point to a web page of advertising entity server 308 for this purpose (as indicated in FIG. 3 by arrow 350). A web page 314 of advertising entity server 308 may be the web page desired by the advertising entity to be displayed when the advertisement image is selected. Thus, advertisement server 306 stores a link to web page 314. Therefore, when the generic advertisement destination link is traversed by selecting the advertisement image in web page 310 on online device 302, advertisement server 306 accesses the stored address of web page 314. Advertising entity server 308 is caused to transmit web page 314 to online device 302 (as indicated in FIG. 3 by arrow 360) for display.

Conventional systems for online servicing of advertisements, such as system 300 shown in FIG. 3, have limitations. System 300 cannot service advertisements in situations where the generic advertisement destination link is traversed before the associated advertisement image file is selected and transferred to online device 302. This is because advertisement sever 306 does not select an advertisement for a particular web page until the advertisement image file is requested. Thus, if the generic advertisement destination link is first traversed, no advertisement has been selected, and thus no advertising entity web page can be returned.

Figure 5:
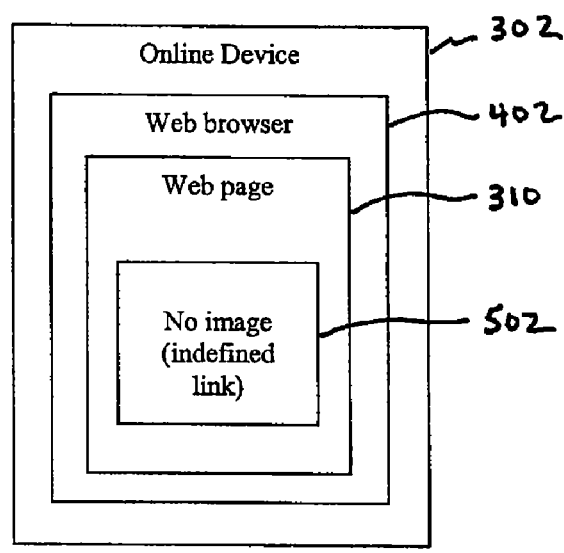

For example, as shown in FIG. 5, web browser 402 of online device 302 may be directed to display web page 310. Thus, advertisement 312 should be displayed on web page 310. However, in some situations, no advertising image file will have been requested from advertising server 306 for display. For example, web browser 402 can configured by a user to not display pictures/images. In another example, a user may stop downloading of a web page 310 before the advertising image file has been selected. In such a situation, an undefined advertisement 502 is displayed on web page 310, which may be displayed as a "broken image" icon on web page 310 for advertisement 312. In this situation, if a user selects (e.g., clicks on) undefined advertisement 502 in web page 310, the generic advertisement destination link will traverse to advertisement server 306 as usual. However, as no advertisement image was displayed on web page 310, advertisement server 306 has not yet selected an advertisement. Thus advertisement 502 is undefined, and advertisement server 306 does not know what advertiser's web page to cause to be displayed on online device 302. Thus, in this situation, this conventional online advertisement servicing scheme fails.

Offline Advertisement Servicing Embodiments

In embodiments of the present invention, advertisements are serviced for mobile devices that operate in an offline mode. Furthermore, the above-described limitations of advertisement servicing for online devices are overcome for the offline mobile devices.

Figure 6:
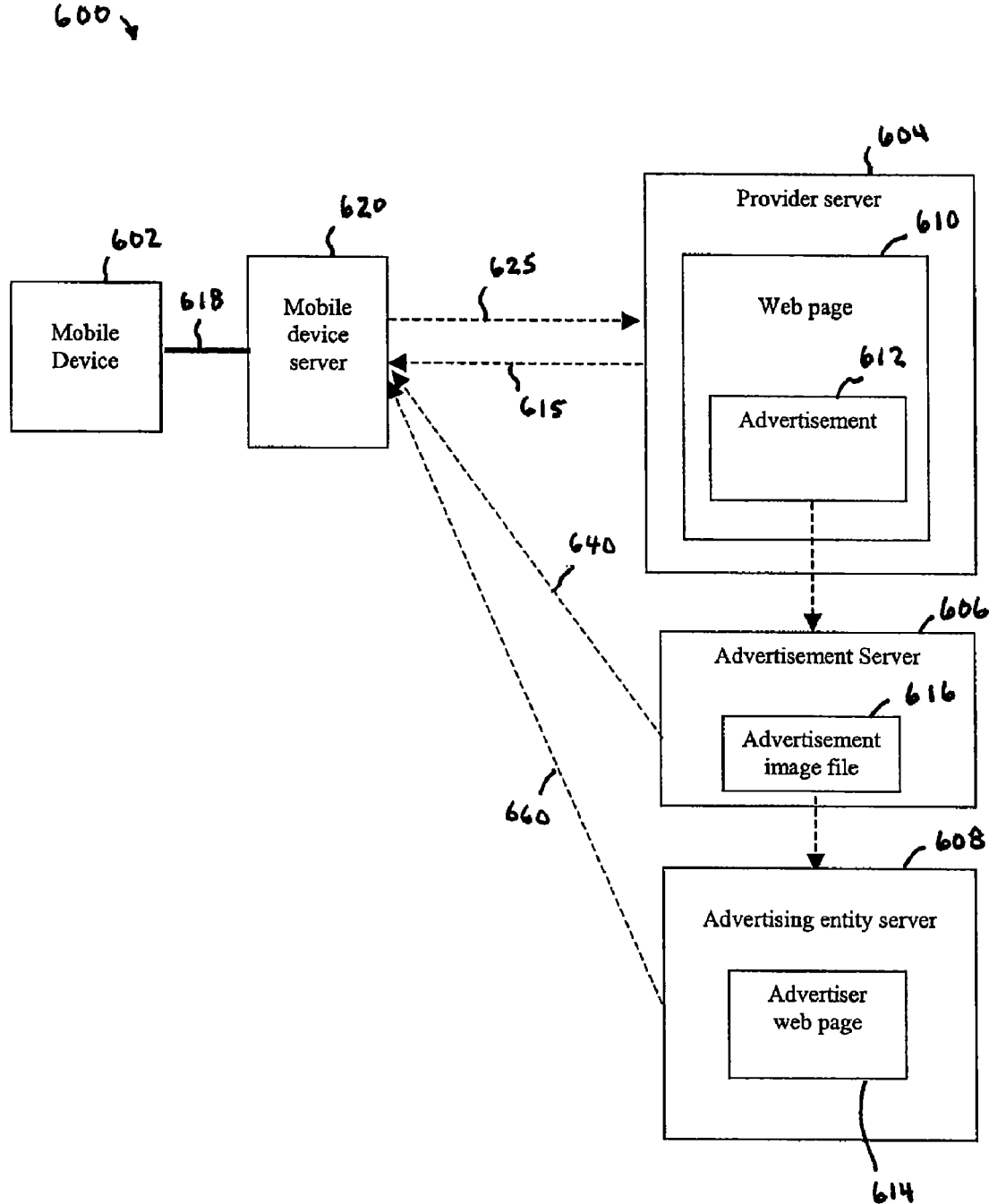
FIG. 6 shows a system for servicing advertisements for use on a mobile device during offline operation, according to an example embodiment of the present invention.

An example advertisement servicing scheme for mobile devices, according to an embodiment of the present invention, is described with reference to FIG. 6. FIG. 6 shows a system 600, which includes a mobile device 602, a provider server 604, an advertisement server 606, an advertising entity server 608, and a mobile device server 620. Elements of system 600 labeled similarly to those of system 300 shown in FIG. 3 are generally similar, with differences described below. Furthermore, mobile device 602 is generally similar to mobile client device 102, and mobile device server 620 is generally similar to mobile client server 104 shown in FIGS. 1 and 2, with differences described below.

As described above for mobile client server 104, mobile device server 620 requests objects, such as a web page 610, and other channels/objects for mobile device 602. In an offline mode, mobile device 602 interacts with the objects, including using a web browser to view web page 610.

Mobile device server 620 requests web page 610 (as indicated in FIG. 6 by arrow 625). Web page 610 is transmitted by provider server 604, and received by mobile device server 620 (as indicated in FIG. 6 by arrow 615). Web page 610 includes an advertisement 612. When web page 610 is displayed, advertisement 612 is displayed as an image, such as an advertisement banner, that may be selected (i.e., clicked on or otherwise interacted with) to view a web page of an advertising entity.

Figure 7:
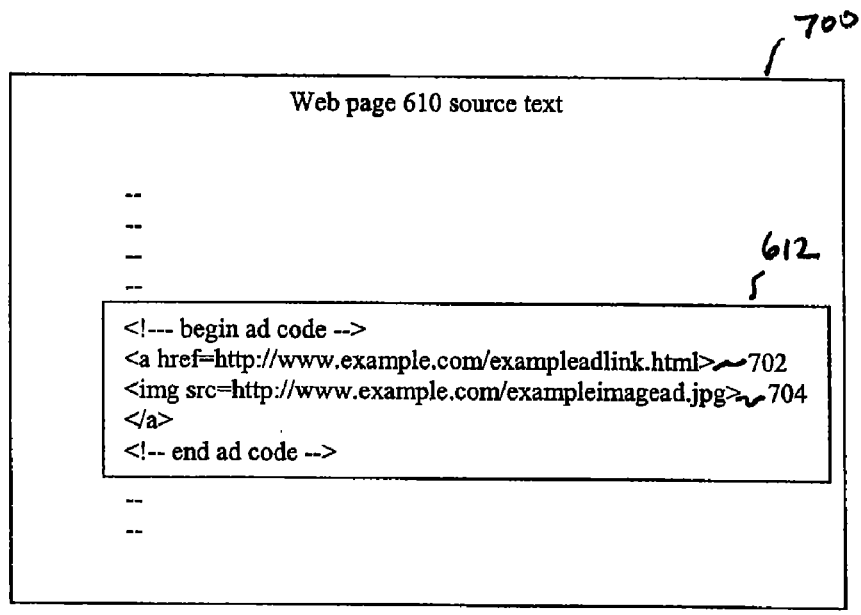
FIG. 7 shows example source code for an example web page.

FIG. 7 illustrates source code 700 for web page 610 (lines of source code are represented as "--" for illustrative purposes). In source code 700, which can be HTML, XML, or other code format, advertisement 612 includes a generic advertisement image file link 702 and a generic advertisement destination link 704 (shown as "www.example.com/exampleadlink.html" and "www.example.com/exampleimagead.jpg" in FIG. 7, respectively, for illustrative purposes). Generic advertisement image file link 702 provides a generic address for an advertisement image file. Generic advertisement destination link 704 provides a generic address for an advertising entity's web page. The generic addresses of generic advertisement image file link 702 and generic advertisement destination link 704 both point to advertisement server 606.

In an embodiment, advertisement server 606 may be operated by an advertising service that has one or more clients (advertisers or advertising entities) desiring to advertise their products or services. Furthermore, the advertising service purchases or otherwise obtains advertising space on various provider websites, including web page 610. Thus, advertisement server 606 provides advertisements, such as advertisement 612, to providers, such as provider server 604, for its clients.

In an embodiment, during a synchronization process between mobile device server 620 and mobile device 602, mobile device server 620 parses source code 700 of web page 610 to find links 702 and 704. As a result, mobile device server 620 requests advertisement server 606 to transmit the respective file/web page to mobile device server 620 (as indicated in FIG. 6 by arrow 640).

Advertisement server 606 serves links 702 and 704. In an embodiment, one or both of links 702 and 704 include information that, when the links are traversed, is used by advertisement server 606 to identify them. For example, one or both links may include a "tag" or other data that identifies their source provider. For example, web page 610 may be a web page of YAHOO!. Thus, one or both links may identify YAHOO! as their source provider. Furthermore, one or both links may include a "tag" or other data that identifies the specific web page of the provider website in which the advertisement is present (e.g., a page number, a page name, etc.). In this manner, advertisement server 606 can select an advertisement appropriate to the provider and web page, if desired. Alternatively, or additionally, advertisement server 606 may use user preferences to select an advertisement, as further described elsewhere herein.

In embodiments, advertisement server 606 serves links 702 and 704 by supplying an advertisement for advertisement 612 to mobile device server 620. First, advertisement server 606 selects an advertisement to be supplied as advertisement 612. Then, in one embodiment, after selection of the advertisement for advertisement 612, advertisement server 606 transmits one or both of an advertisement image file and advertiser web page to mobile device server 620. In an alternative embodiment, after selection of the advertisement for advertisement 612 by advertisement server 606, advertisement server 606 directs advertising entity server 608 to supply one or both of the advertisement image file and advertisement web page to mobile device server 620 (e.g., advertisement server 606 re-directs links 702 and 704 to advertising entity server 608).

For illustrative purposes, FIG. 6 shows an advertisement image file 616 stored in, and transmitted by mobile device server 606 (as indicated by arrow 640), and shows an advertiser web page 614 stored in, and transmitted by advertising entity 660 (as indicated by arrow 640). However, as described above, either of advertisement server 606 and advertising entity server 608 can store and serve both of advertisement image file 616 and advertiser web page 614, or one can store and serve one of the files, and the other can store and serve the other file.

Once the requested file/web page have been received by mobile device server 620, the files can be encoded (if desired), and transferred to mobile device 602. For example, similarly to as described above, web page 610 can be parsed and encoded to map online resource links to offline resource links. In other words, links 702 and 704 can be mapped from online resources to the offline resource locations on mobile device 602 for advertisement image file 616 and advertiser web page 614.

Figure 8:
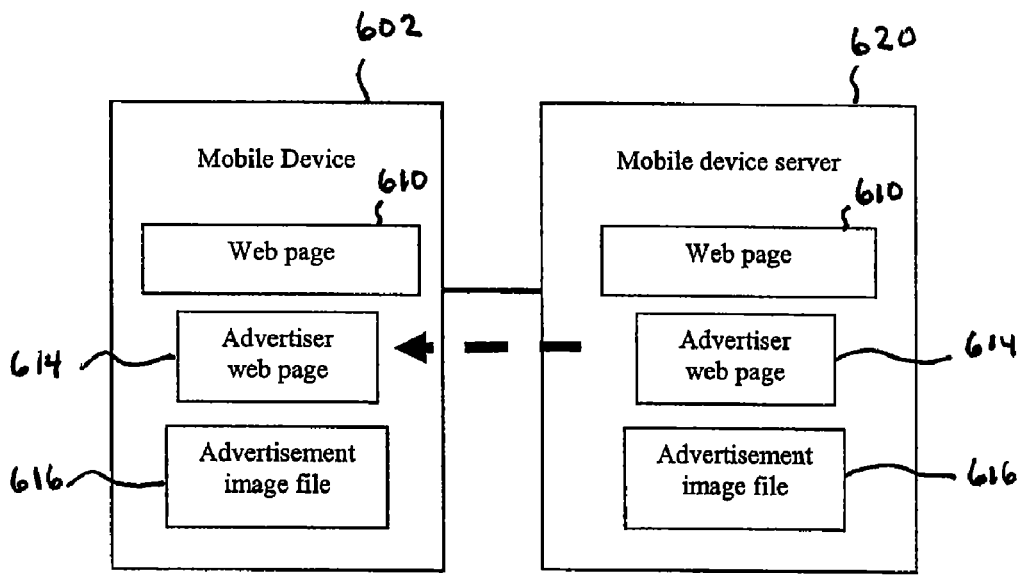
FIG. 8 shows a transfer of an example provider web page, advertiser web page, and advertisement image file from a mobile device server to a mobile device, according to an example embodiment of the present invention.

FIG. 8 shows a transfer of web page 610, advertiser web page 614, and advertisement image file 616 from mobile device server 620 to mobile device 602. For example, the transfer of these items to mobile device 602 from mobile device server 620 may occur during a synchronization process, such as described above with respect to FIG. 2, although the transfer may alternatively occur in other ways. Furthermore, as described above, the versions of web page 610 and advertiser web page 614 stored on mobile device 602 may be encoded/formatted versions.

Figure 9:
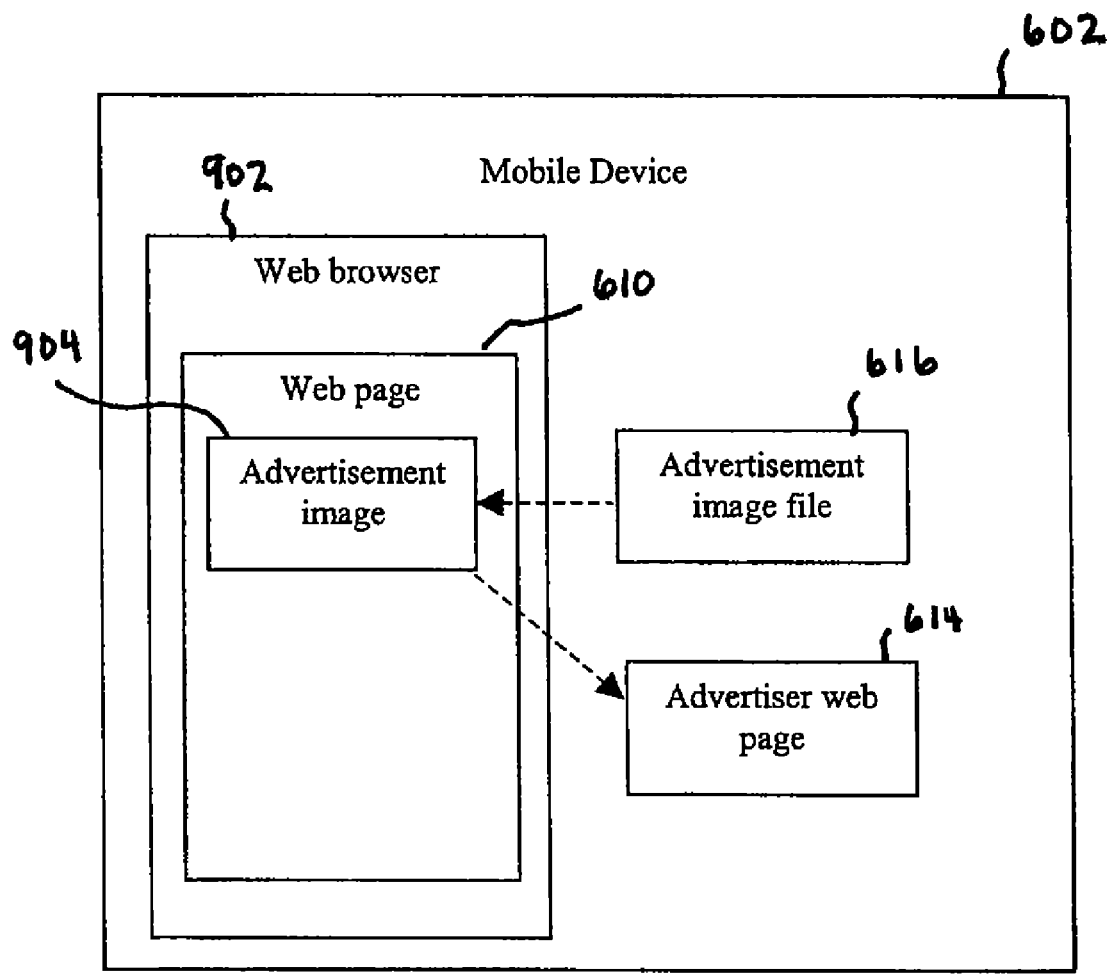
FIG. 9 shows a mobile device having a web browser displaying a web page, according to an example embodiment of the present invention.

FIG. 9 shows mobile device 602 having a web browser 902 displaying web page 610 during offline operation, according to an embodiment of the present invention. As shown in FIG. 9, web page 610 displays an advertisement image 904 contained by advertisement image file 616. When a user selects or otherwise interacts with advertisement image 904 in a predetermined manner, the offline advertisement destination link is traversed, and web browser 902 displays advertiser web page 614.

As described above, conventional systems for online servicing of advertisements, such as system 300 shown in FIG. 3, have limitations. The present invention does not suffer from these limitations. For example, system 300 cannot service advertisements in situations where the generic advertisement destination link is traversed before the associated advertisement image file is selected and transferred to an online device. In the present invention for servicing advertisements in mobile devices, advertisement server 606 selects an advertisement for web page 614 when links 702 and 704 are traversed by mobile device server 620. Thus, advertisement image file 616 and advertiser web page 614 are transferred to mobile device server 620 prior to display of web page 610 on mobile device 602. Thus, after synchronization, advertisement image 904 can be displayed on web page 610 during offline operation of mobile device 602, and advertiser web page 614 will be present on mobile device 602. Thus, an advertisement is always present for a web page in the offline system of the present invention, and therefore the present invention does not suffer from the deficiencies of the conventional online system.

Figure 10:
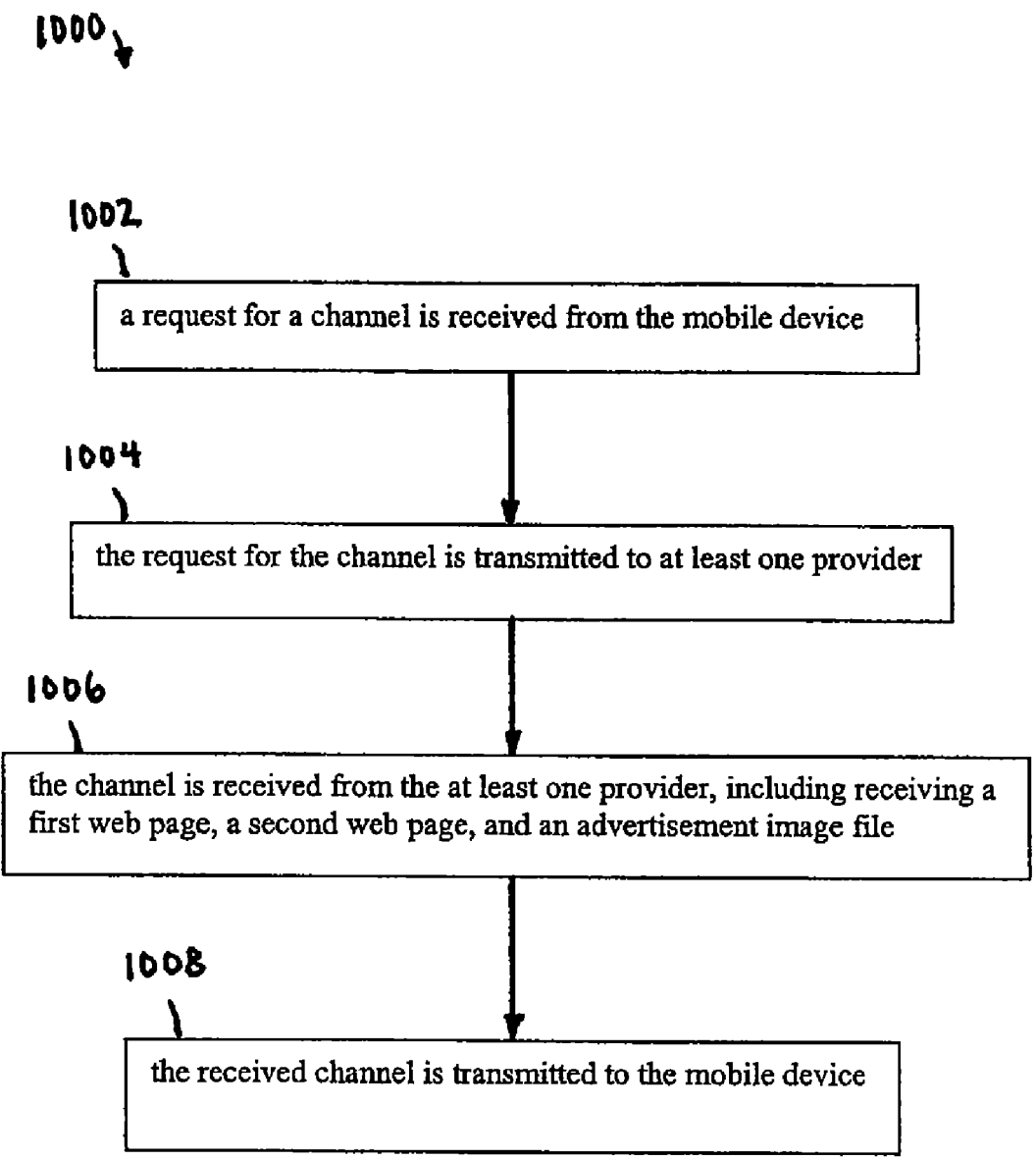
FIG. 10 shows a flowchart providing example steps for servicing advertisements for offline viewing on a mobile device, according to an example embodiment of the present invention.

FIG. 10 shows a flowchart 1000 providing example steps for servicing advertisements for offline viewing on a mobile device, such as mobile client device 102, according to an example embodiment of the present invention. For example, the steps of flowchart 1000 may be performed by one or more servers, such as mobile device server 620 shown in FIG. 6. In an embodiment, the steps shown in FIG. 10 may occur during a synchronization process between mobile device 602 and mobile device server 620, although they can occur during another data transfer process. Other structural and operational embodiments will be apparent to persons skilled in the relevant art(s) based on the following discussion. These steps are described in detail below.

Flowchart 1000 begins with step 1002. In step 1002, a request for a channel is received from the mobile device. For example, in an embodiment, the mobile device may be mobile device 602 shown in FIG. 6. As shown in FIG. 6, when in an "online" mode, such as during a synchronization process, mobile device 602 communicates with mobile device server 620 over communication link 618, which is similar to communication link 202 shown in FIG. 2. Mobile device 602 requests one or more channels from mobile device server 620 over communication link 618.

In step 1004, a request for the channel is transmitted to at least one provider. For example, in an embodiment, the provider is represented by provider server 604, as shown in FIG. 6. An example request for a channel from mobile device server 620 to provider server 604 is indicated by arrow 625 in FIG. 6.

In step 1006, the channel is received from the at least one provider, including receiving a first web page, a second web page, and an advertisement image file. For example, in an embodiment, the first web page is provider web page 610, the second web page is advertiser web page 614, and the advertisement image file is advertisement image file 616.

For example, in an embodiment, the first web page includes a generic advertisement, which may be advertisement 612. In the first web page, advertisement 612 includes a generic advertisement image file reference or link and an associated generic advertisement destination link that are related to the generic advertisement. For example, the generic advertisement image file reference is generic advertisement image file reference 702 and the associated generic advertisement destination link is generic advertisement destination link 704, as shown in FIG. 7.

Note that the second web page and advertisement image file can be received in any order. In other words, the second web page (e.g., advertiser web page 614) can be received by mobile device server 620 before or after the advertisement image file (e.g., advertisement image file 616). This is not possible in the conventional "online" advertisement servicing scheme described above with reference to FIG. 3. In the conventional "online" advertisement servicing scheme, the advertisement image file must be first selected by the advertisement server so that the advertisement server knows what advertisement has been selected. This limitation is not present in the present invention.

In step 1008, the received channel is transmitted to the mobile device. As shown in FIG. 6, when in an "online" mode, such as during a synchronization process, mobile device 602 communicates with mobile device server 620 over communication link 618, which is similar to communication link 202 shown in FIG. 2. Mobile device server 620 transmits the received channel to mobile device 602 over communication link 618. In an embodiment, transmitting the received channel includes transmitting the first web page, second web page, and advertisement image file to the mobile device.

Note that prior to step 1008, in an embodiment, the mobile device server may process the received channel for offline use. For example, as described above, mobile device server 620 may parse and encode copied web pages to map references to online objects/resources to offline objects/resources.

As a result, in an "offline mode," displaying the first web page on the mobile device causes the received advertisement image file to be displayed in the first web page. When in the offline mode, mobile device 602 and mobile device server 620 are not coupled. A web browser of the mobile device can display the first web page, e.g., web page 610, causing the image 904 of advertisement image file 616 to be displayed for advertisement 612, as shown in FIG. 9.

Furthermore, in the offline mode, a user viewing the first web page on the mobile device can select the displayed advertisement image file to cause the second web page to be displayed on the mobile device. For example, in an embodiment, a user of mobile device 602 can click on (or otherwise select or interact with) the advertisement image 904 to traverse the advertisement destination link, to cause advertiser web page 614 to be displayed on mobile device 602.

In an embodiment, step 1004 includes transmitting user preferences of a user of the mobile device to at least one provider. In an embodiment, mobile device server 620 may store user preferences/characteristics of a user of mobile device 602. For example, mobile device server 620 may store demographics information, employment information, interests/hobby-related information, information on past web sites/pages visited (e.g., "cookie"-type information) etc., regarding the user of mobile device 602. The user may have voluntarily entered this information directly into mobile device 602 and/or mobile device server 620, and/or the information may have been automatically collected by mobile device 602 and/or mobile device server 620. In an embodiment, this user preference information may be transmitted to a provider such as advertisement server 606. Advertisement server 606 may use the user preference information to aid in selecting an advertisement appropriate to the user, directed to the user's background and/or interests.

Figure 11:
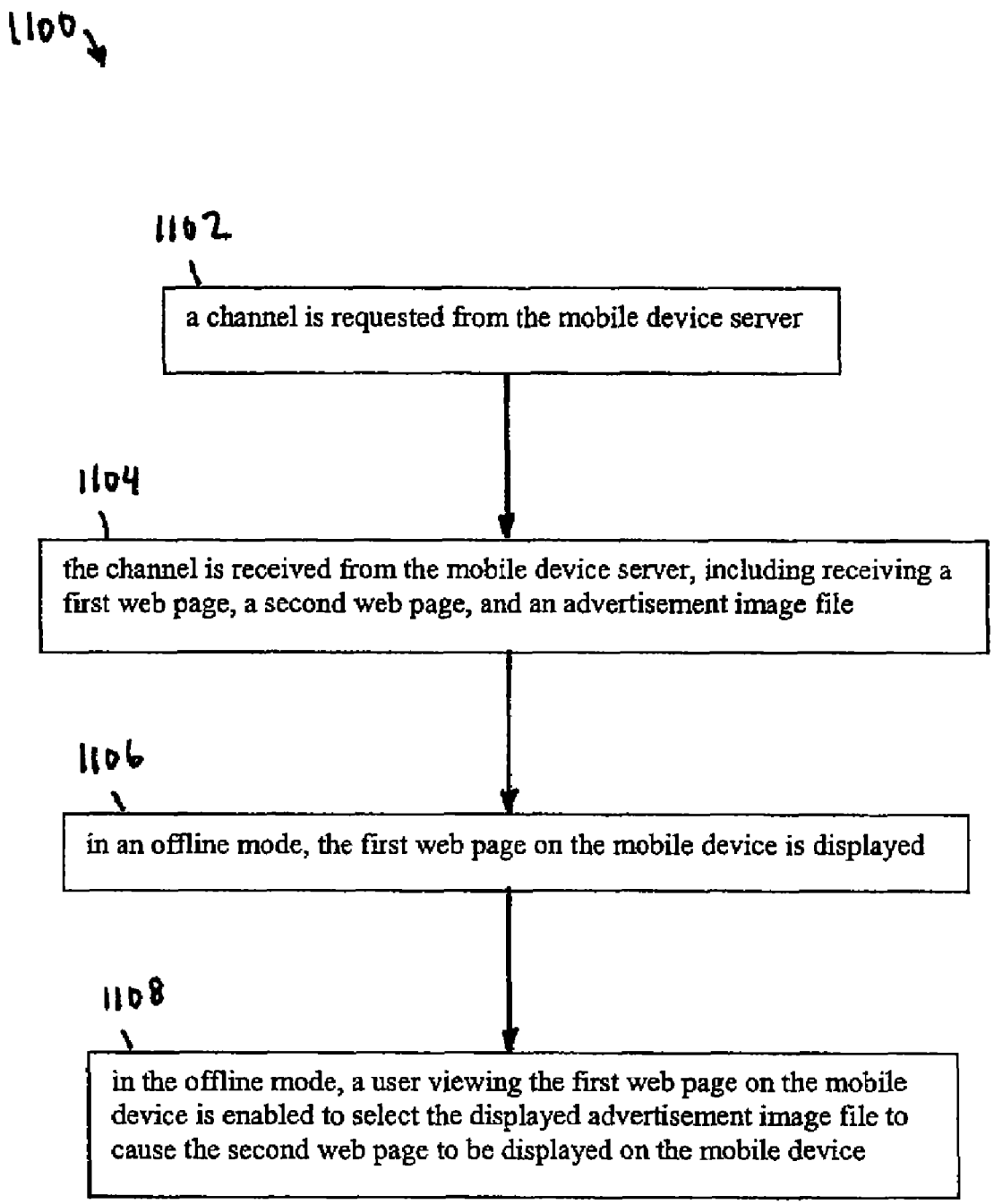
FIG. 11 shows a flowchart providing example steps in a mobile device for servicing advertisements for offline viewing, according to an example embodiment of the present invention.

FIG. 11 shows a flowchart 1100 providing example steps in a mobile device for servicing advertisements for offline viewing, according to an example embodiment of the present invention. For example, the steps of flowchart 1100 may be performed by a mobile device, such as mobile device 602 shown in FIG. 6. In an embodiment, steps 1102 and 1104 shown in FIG. 11 may occur during a synchronization process between mobile device 602 and mobile device server 620, although these steps do not have to occur during a synchronization. Other structural and operational embodiments will be apparent to persons skilled in the relevant art(s) based on the following discussion. These steps are described in detail below.

Flowchart 1100 begins with step 1102. In step 1102, a channel is requested from the mobile device server. For example, in an embodiment, the mobile device server may be mobile device server 620 shown in FIG. 6. As shown in FIG. 6, when in an "online" mode, such as during a synchronization process, mobile device 602 communicates with mobile device server 620 over communication link 618, which is similar to communication link 202 shown in FIG. 2. Mobile device 602 requests one or more channels from mobile device server 620 over communication link 618.

In step 1104, the channel is received from the mobile device server, including receiving a first web page, a second web page, and an advertisement image file. Mobile device 602 receives the channel from mobile device server 620 over communication link 618. For example, in an embodiment, the first web page is provider web page 610, the second web page is advertiser web page 614, and the advertisement image file is advertisement image file 616.

In an embodiment, the first web page is a parsed and encoded form of a web page (which may be web page 610)

copied by mobile device server 602 from a provider. The first web page includes references or links to the received advertisement image file and the second web page. The second web page is a web page (which may be advertiser web page 614) (encoded or unencoded) of an advertiser associated with the advertisement image file.

In step 1106, in an offline mode, the first web page on the mobile device is displayed. For example, in an embodiment, step 1106 includes displaying the received advertisement image file in the first web page. When in the offline mode, mobile device 602 and mobile device server 620 are not coupled or in communication. A web browser of the mobile device can display the first web page, e.g., web page 610, causing the image 904 of advertisement image file 616 to be displayed for advertisement 612, as shown in FIG. 9.

In step 1108, in the offline mode, a user viewing the first web page on the mobile device is enabled to select the displayed advertisement image file to cause the second web page to be displayed on the mobile device. For example, in an embodiment, a user of mobile device 602 can click on (or otherwise select) advertisement image 904 to traverse the advertisement destination link, to cause advertiser web page 614 to be displayed on mobile device 602.

Figure 12:
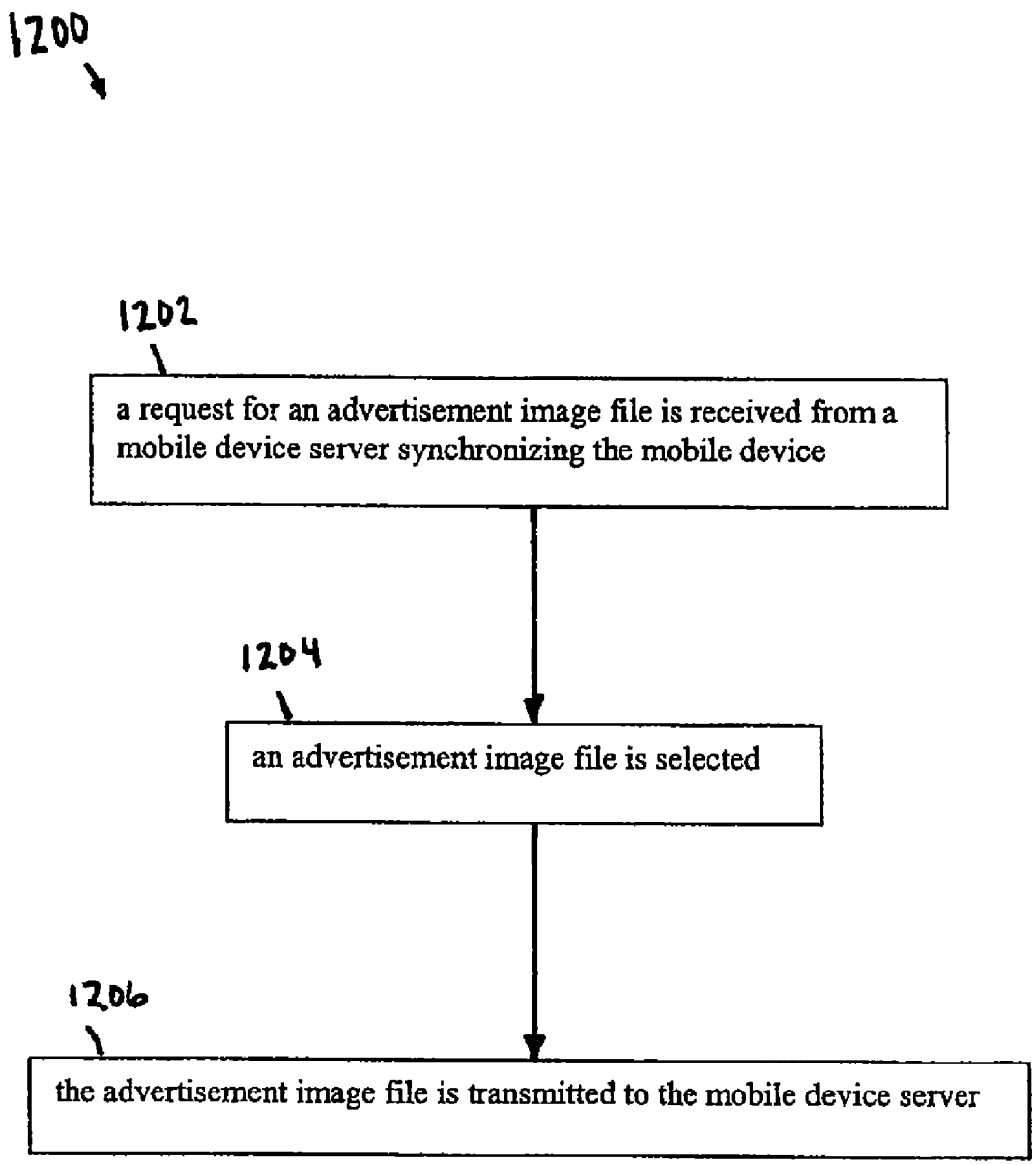
FIG. 12 shows a flowchart providing example steps in an advertisement server for servicing advertisements for offline viewing, according to an example embodiment of the present invention.

FIG. 12 shows a flowchart 1200 providing example steps in an advertisement server for servicing advertisements for offline viewing, according to an example embodiment of the present invention. For example, the steps of flowchart 1200 may be performed by an advertisement server, such as advertisement server 606 shown in FIG. 6. In an embodiment, the steps shown in FIG. 12 may occur during a synchronization process between a mobile device and a mobile device server, although these steps do not have to occur during a synchronization. Other structural and operational embodiments will be apparent to persons skilled in the relevant art(s) based on the following discussion. These steps are described in detail below.

Flowchart 1200 begins with step 1202. In step 1202, a request for an advertisement image file is received from a mobile device server synchronizing the mobile device. For example, in an embodiment, advertisement image file 616 is requested by mobile device server 606. As described above, this request of mobile device server 606 may be received directly from mobile device server 620, or through provider server 604.

In step 1204, an advertisement image file is selected. For example, advertisement image file 616 can be selected from a library of available advertisement image files of advertisements. Advertisement image file 616 can be selected based on a user's preferences to direct the advertisement to the user's background and/or interests. Advertisement server 606 may receive the user preferences from mobile device server 620, or may have them already pre-stored within or otherwise accessible. Advertisement server 606 can include hardware, software, firmware, and any combination thereof, to perform the advertisement selection function.

In step 1206, the advertisement image file is transmitted to the mobile device server. For example, advertisement image file 616 may be transmitted to mobile device server 620, as indicated by arrow 640 in FIG. 6. Alternatively, the advertisement server may direct an advertising entity server (e.g., by redirecting the received request of step 1202) to transmit the advertisement image file to the mobile device server.

Furthermore, the advertisement server may direct the advertising entity server to transmit a web page of the advertising entity to the mobile device server in response to a request from the mobile device server.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. For example, the advertisement servicing and cycling inventions described above may be applied to the servicing and cycling of objects other than advertisements. The present invention is applicable to the servicing and cycling of other types of files, including web pages and image files other than those that are advertisement related. Thus, the breadth and scope of the present invention should not be limited by any of the above-described exemplary embodiments, but should be defined only in accordance with the following claims and their equivalents.

What is claimed is:

1. A method in a mobile device server for servicing advertisements for offline viewing on a mobile device, comprising:
   synchronizing the mobile device with the mobile device server, including the steps of:
   (a) receiving a request for a channel from the mobile device;
   (b) transmitting a request for the channel to at least one provider;
   (c) receiving the channel from the at least one provider, including the step of receiving a first web page, and a second web page, wherein mark-up language defining the first web page includes a generic advertisement image file link and an associated generic advertisement link, wherein the generic advertisement image file link addresses an advertisement image file that is stored at the at least one provider that is separate from the mobile device and the mobile device server, wherein the second web page is a web page of an advertiser associated with the advertisement image file;
   (d) automatically encoding the mark-up language defining the first web page to replace the generic advertisement image file link with another link comprising a tag, the tag including instructions instructing the mobile device to enable an advertisement cycler, wherein the advertisement cycler is configured to retrieve advertisement image files stored on the mobile device and cycle, on the first web page, the retrieved advertisement image files when the encoded tag in the mark-up language is parsed by the mobile device; and
   (e) transmitting the received channel with the encoded first web-page to the mobile device.

2. The method of claim 1, wherein step (c) comprises:
   receiving the first web page from a first provider; and
   receiving the second web page and advertisement image file from a server of an advertiser.

3. The method of claim 1, wherein step (b) comprises:
   transmitting user preferences of a user of the mobile device to at least one provider.

4. The method of claim 1, wherein step (b) comprises:
   transmitting a request for an advertisement image file to an advertisement server.

5. The method of claim 4, wherein step (b) further comprises:
   causing the advertisement server to select an advertisement.

6. The method of claim 1, wherein step (d) further comprises:
mapping links in the mark-up language defining the first web page from online objects to offline objects stored on the mobile device.

7. The method of claim 6, wherein the mapping step comprises:
mapping the generic advertisement image file link and the associated generic advertisement link in the mark-up language defining the first web page to addresses on the mobile device of the advertisement image file and second web page, respectively.

8. A method in a mobile device server for servicing advertisements for offline viewing on a mobile device, comprising:
(a) receiving a request for a channel from the mobile device;
(b) transmitting a request for the channel to at least one provider;
(c) receiving the channel from the at least one provider, including the step of receiving a first web page, and an advertiser web page, wherein mark-up language defining the first web page includes a generic advertisement image file link and an associated generic advertisement link, wherein the generic advertisement image file link addresses an advertisement image file that is stored at the at least one provider that is separate from the mobile device and the mobile device server, wherein the second web page is a web page of an advertiser associated with the advertisement image file;
(d) automatically encoding the mark-up language defining the first web page to replace the generic advertisement image file link with another link comprising a tag, the tag including instructions instructing the mobile device to enable an advertisement cycler, wherein the advertisement cycler is configured to retrieve advertisement image files stored on the mobile device and cycle, on the first web page, the retrieved advertisement image files when the encoded tag in the mark-up language is parsed by the mobile device; and
(e) transmitting the received channel with the encoded first web-page to the mobile device.

9. The method of claim 8, wherein step (c) comprises:
receiving the first web page from a first provider; and
receiving the advertiser web page and advertisement image file from a server of an advertiser.

10. The method of claim 8, wherein step (b) comprises:
transmitting user preferences of a user of the mobile device to at least one provider.

11. The method of claim 8, wherein step (b) comprises:
transmitting a request for an advertisement image file to an advertisement server.

12. The method of claim 11, wherein step (b) further comprises:
causing the advertisement server to select an advertisement.

13. The method of claim 8, wherein step (d) further comprises:
mapping links, in the mark-up language defining the first web page from online objects to offline objects stored on the mobile device.

14. The method of claim 13, wherein the mapping step comprises:
mapping the generic advertisement image file link and the associated generic advertisement link in the mark-up language defining the first web page to addresses on the mobile device of the advertisement image file and advertiser web page, respectively.

15. A method in a mobile device for servicing of advertisements, comprising:
synchronizing the mobile device with a mobile device server, including the steps of:
requesting a channel from the mobile device server,
receiving the channel from the mobile device server, including the step of receiving a first web page, and a second web page, wherein mark-up language defining the first web page includes a link comprising a tag, the link and the tag previously encoded in place of a generic advertisement image file link, wherein the generic advertisement image file link addresses an advertisement image file that is stored at a provider that is separate from the mobile device and the mobile device server, and wherein the second web page is a web page of an advertiser associated with the advertisement image file;
enabling the advertisement cycler when the encoded tag in the mark-up language is parsed by the mobile device, wherein the tag includes instructions instructing the mobile device to enable an advertisement cycler,
wherein the advertisement cycler is configured to retrieve advertisement image files stored on the mobile device and cycle, on the first web page, the retrieved advertisement image files.

16. A computer program product including a non-transitory computer-readable storage medium having instructions stored thereon that, if executed by a processing device, cause the processing device to perform operations comprising:
receiving a request for a channel from the mobile device;
transmitting a request for the channel to at least one provider;
receiving the channel from the at least one provider, including the step of receiving a first web page, and a second web page, wherein mark-up language defining the first web page includes a generic advertisement image file link and an associated generic advertisement link, wherein the generic advertisement image file link addresses an advertisement image file that is stored at the at least one provider that is separate from the mobile device and the mobile device server, wherein the second web page is a web page of an advertiser associated with the advertisement image file;
automatically encoding the mark-up language defining the first web page to replace the generic advertisement image file link with another link comprising a tag, the tag including instructions instructing the mobile device to enable an advertisement cycler, wherein the advertisement cycler is configured to retrieve advertisement image files stored on the mobile device and cycle, on the first web page, the retrieved advertisement image files when the encoded tag in the mark-up language is parsed by the mobile device; and
transmitting the received channel with the encoded first web-page to the mobile device.

17. A computer program product including a non-transitory computer-readable storage medium having instructions stored thereon that, if executed by a processing device, cause the processing device to perform operations comprising:
synchronizing a mobile device with a mobile device server, including the steps of:
requesting a channel from the mobile device server,
receiving the channel from the mobile device server, including the step of receiving a first web page, and a second web page, wherein mark-up language defining the first web page includes a link comprising a tag, the link and the tag previously encoded in place of a generic advertisement image file link, wherein the generic advertisement image file link addresses an advertisement image file that is stored at a provider that is separate from the mobile device and the mobile device server, and wherein the second web page is a web page of an advertiser associated with the advertisement image file;

enabling the advertisement cycler when the encoded tag in the mark-up language is parsed by the mobile device, wherein the tag includes instructions instructing the mobile device to enable an advertisement cycler, wherein the advertisement cycler is configured to retrieve advertisement image files stored on the mobile device and cycle, on the first web page, the retrieved advertisement image files.

18. The method of claim 1, wherein at least one of the generic advertisement image file link and the generic advertisement link includes a separate tag that identifies a web page name of a website belonging to the at least one provider, wherein the identified web page includes an advertisement.

19. A system for servicing advertisements for offline viewing on a mobile device, comprising:

a first module configured to receive a request for a channel from the mobile device;

a second module configured to transmit a request for the channel to at least one provider;

a third module configured to receive the channel from the at least one provider, including the step of receiving a first web page, and a second web page, wherein mark-up language defining the first web page includes a generic advertisement image file link and an associated generic advertisement link, wherein the generic advertisement image file link addresses an advertisement image file that is stored at the at least one provider that is separate from the mobile device and the mobile device server, wherein the second web page is a web page of an advertiser associated with the advertisement image file;

a fourth module configured to automatically encode the mark-up language defining the first web page to replace the generic advertisement image file link with another link comprising a tag, the tag including instructions instructing the mobile device to enable an advertisement cycler, wherein the advertisement cycler is configured to retrieve advertisement image files stored on the mobile device and cycle, on the first web page, the retrieved advertisement image files when the encoded tag in the mark-up language is parsed by the mobile device; and a fifth module configured to transmit the received channel with the encoded first web-page to the mobile device, wherein said first module, said second module, said third module, said fourth module and said fifth module are implemented using one or more processors.

* * * * *